(12) United States Patent
Yukizane et al.

(10) Patent No.: US 10,223,899 B2
(45) Date of Patent: Mar. 5, 2019

(54) SENSOR NETWORK SYSTEM

(71) Applicant: Panasonic Intellectual Property Management Co., Ltd., Osaka (JP)

(72) Inventors: Ryota Yukizane, Fukuoka (JP); Taisuke Konishi, Fukuoka (JP); Shunsuke Nagayasu, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/762,814

(22) PCT Filed: Aug. 23, 2016

(86) PCT No.: PCT/JP2016/003824
§ 371 (c)(1),
(2) Date: Mar. 23, 2018

(87) PCT Pub. No.: WO2017/056377
PCT Pub. Date: Apr. 6, 2017

(65) Prior Publication Data
US 2018/0276980 A1    Sep. 27, 2018

(30) Foreign Application Priority Data
Sep. 30, 2015    (JP) .................................. 2015-193704

(51) Int. Cl.
*G08B 1/08*    (2006.01)
*G08B 25/06*    (2006.01)
(Continued)

(52) U.S. Cl.
CPC ............. *G08B 25/06* (2013.01); *G08B 17/00* (2013.01); *G08B 25/10* (2013.01); *G08B 27/00* (2013.01);
(Continued)

(58) Field of Classification Search
None
See application file for complete search history.

(56) References Cited

U.S. PATENT DOCUMENTS 9,965,936 B1 * 5/2018 Epps ....................... G08B 21/02
9,984,558 B2 * 5/2018 Artes ...................... G05D 1/0274
(Continued)

FOREIGN PATENT DOCUMENTS

JP    2000-182174 A    6/2000
JP       5146276 B2    2/2013
JP    2008-295020 A   12/2018

OTHER PUBLICATIONS

International Search Report, dated Oct. 4, 2016, for related International Patent Application PCT/JP2016/003824, 1 page.

*Primary Examiner* — Julie B Lieu
(74) *Attorney, Agent, or Firm* — Seed IP Law Group LLP

(57) ABSTRACT

Provided is a sensor network system including sensor master devices (15A to 15D) which receive detection information obtained by sensors (11A to 11F) through wireless communication, a data server (17) which acquires the detection information from the sensor master devices (15A to 15D) through power line communication, and notification devices (13A, 13B) which receive notification information from the data server (17) to perform notification, in which the sensor master devices (15A to 15D) are connected to the sensors (11A to 11F) and the notification devices (13A, 13B), and the data server (17) determines an object to be notified in accordance with, for example, a detection position which is detection information for at least one of an object to be notified and notification contents, on the basis of the acquired detection information.

17 Claims, 15 Drawing Sheets

(51) Int. Cl.
*G08B 17/00* (2006.01)
*G08B 25/10* (2006.01)
*G08B 27/00* (2006.01)
*H04M 11/04* (2006.01)
*H04B 3/54* (2006.01)
*H04L 29/08* (2006.01)
*H04Q 9/00* (2006.01)

(52) U.S. Cl.
CPC ............ *H04B 3/542* (2013.01); *H04L 67/12* (2013.01); *H04M 11/04* (2013.01); *H04B 2203/5441* (2013.01); *H04B 2203/5458* (2013.01); *H04Q 9/00* (2013.01); *H04Q 2209/30* (2013.01); *H04Q 2209/40* (2013.01)

(56) References Cited

U.S. PATENT DOCUMENTS

| | | | | |
|---|---|---|---|---|
| 10,037,666 B2* | 7/2018 | Warren | ................ | G08B 19/00 |
| 2004/0246123 A1* | 12/2004 | Kawabe | ........... | G08B 13/19602 340/506 |
| 2007/0262863 A1* | 11/2007 | Aritsuka | ................ | H04B 17/27 340/539.22 |
| 2013/0241744 A1* | 9/2013 | Erdos | ....................... | H04Q 9/00 340/870.02 |
| 2015/0097663 A1* | 4/2015 | Sloo | ........................ | F24F 11/30 340/501 |
| 2015/0163412 A1* | 6/2015 | Holley | ................... | G05B 15/02 348/143 |
| 2016/0050037 A1* | 2/2016 | Webb | ..................... | H04W 4/90 455/3.01 |
| 2016/0232774 A1* | 8/2016 | Noland | .............. | G08B 13/1672 |
| 2016/0379471 A1* | 12/2016 | Eyring | ................ | G08B 25/008 340/506 |
| 2017/0109983 A1* | 4/2017 | Flint | .................. | H04M 1/0291 |
| 2017/0206766 A1* | 7/2017 | Child | ................. | G08B 21/0211 |
| 2018/0113577 A1* | 4/2018 | Burns | ................ | G06F 3/04817 |

* cited by examiner

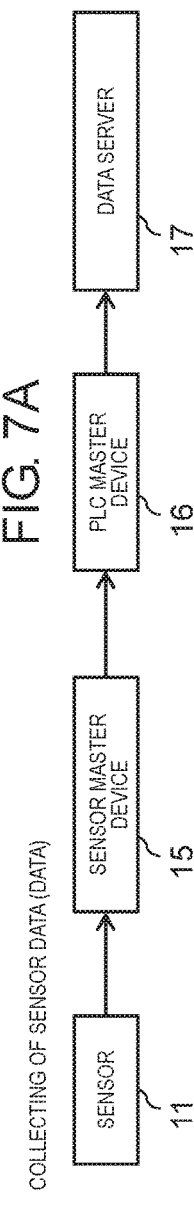
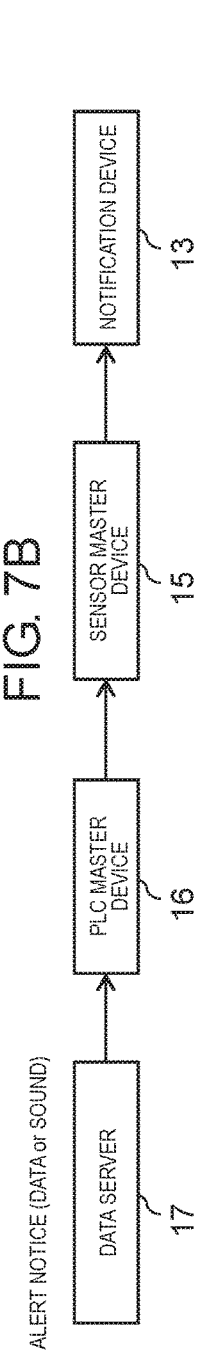
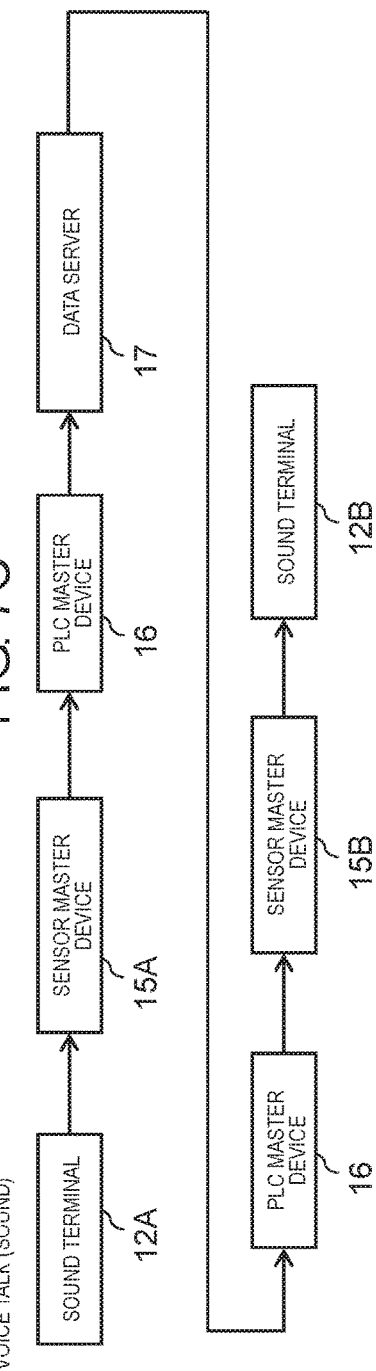

FIG. 10

| SENSOR ID | SENSOR TYPE | SENSOR INSTALLATION AREA | SENSOR MASTER DEVICE ID | SENSOR REACTION ALERT NOTICE AREA | NOTICE CONTENT |
|---|---|---|---|---|---|
| 01 | EMERGENCY BUTTON | 1F-A | 91 | 1F-A,B,C, 2F-A | FIRE REACTION IN (1F-A) MAKE SURE OF SCENE IMMEDIATELY |
| 02 | FIRE SENSOR | 1F-A | 91 | 1F-A,B, 2F-A | FIRE REACTION IN (1F-A) MAKE SURE OF SCENE IMMEDIATELY |
| 03 | EMERGENCY BUTTON | 2F-A | 94 | 1F-A,, 2F-A,B,C | FIRE REACTION IN (2F-A) MAKE SURE OF SCENE IMMEDIATELY |
| 04 | FIRE SENSOR | 2F-A | 94 | 1F-A,, 2F-A,B | FIRE REACTION IN (2F-A) MAKE SURE OF SCENE IMMEDIATELY |
| 05 | SOUND TERMINAL | 1F-C | 93 | MONITORING TERMINAL | REPORTING USING SOUND BY SENDER |
| 06 | SOUND TERMINAL | 2F-C | 96 | MONITORING TERMINAL | REPORTING USING SOUND BY SENDER |
| 07 | EMERGENCY BUTTON | MONITORING ROOM | 99 | ALL AREAS (1F-A,B,C, 2F-A,B,C) | THERE IS FIRE IN [MANUAL SETTING] CALM DOWN AND EVACUATE PLEASE |

FIG. 11

| APPARATUS ID | APPARATUS TYPE | APPARATUS INSTALLATION AREA | SENSOR MASTER DEVICE ID |
|---|---|---|---|
| 11 | NOTIFICATION DEVICE | 1F-B | 92 |
| 12 | NOTIFICATION DEVICE | 2F-B | 95 |
| 05 | SOUND TERMINAL | 1F-C | 93 |
| 06 | SOUND TERMINAL | 2F-C | 96 |

SENSOR NETWORK SYSTEM

TECHNICAL FIELD

The present disclosure relates to a sensor network system that acquires detection information from a sensor installed in an object to be detected.

BACKGROUND ART

In order to perform the acquisition of environment information, such as temperature and humidity, the detection of a fire, and the like, for example, in a factory, a building, and the like, sensors are installed at locations to be detected, and detection systems that acquire various pieces of detection information detected by the sensors are used. At a location where an area to be detected is large, such as a factory or a building, a sensor network system that transmits detection information through a network is constructed, and the detection information is collected.

An example of such a type of sensor network system is an energy monitoring system disclosed in PTL 1. The energy monitoring system which is an example of the related art is configured to include a plurality of sensors, sensor nodes that convert information acquired from each sensor into communication information, a monitoring device that remotely collects and monitors sensor information, and communication means for transmitting information between the sensor node and the monitoring device, and to perform communication by at least two types of wireless sensor nodes having different communication frequencies. With such a configuration, the energy monitoring system can be constructed regardless of power supply conditions or restriction conditions of a frequency band.

In a case where the sensor network system is applied to a factory, a building, and the like, the movement of the sensor or new installation of a sensor may occur in association with the change of a layout, the installation of a new object to be detected, or the like. In a case where detection information from the sensor is acquired by wireless communication, the degree of freedom of disposition of the sensor is given, but communication quality may be deteriorated due to a change in the position of the sensor, or wireless communication may be disabled due to an increase in a transmission distance, the movement of a room, or the like. In this case, it is necessary to use another wireless communication system as an alternative communication system or transmit detection information by using a wired communication system.

For example, in a system that performs monitoring of a manufacturing process in a factory, in a case where the position of a sensor and the number of sensors is changed in association with the rearrangement of a manufacturing line, it may be necessary to change the disposition of a sensor node in order to stably receive detection information from the sensor by wireless communication. The rearrangement of the manufacturing line is performed for each product to be manufactured, or the like, and the change of disposition may be performed a plurality of times in a day in some cases. In a system that performs the monitoring of an indoor environment, the detection of an abnormality, and the like in a building, it may be necessary to perform the change of disposition of a sensor and a sensor node in association with the change of an internal layout.

In order to cope with the change of a layout of an area to be detected, high costs are required to install more new wireless communication systems. Regarding new laying of a transmission cable of a wired communication system in association with the change of a layout, it is difficult to newly lay the cable depending on an environment, and high costs and time are required. In order to cope with various changes of a layout, measures, such as the installation of different wireless sensor node as necessary or the provision of an alternative wired communication system, are required, and it may be difficult to cope with a sensor having a high degree of freedom of the disposition. It is difficult to change a region to be notified, notification contents, and the like and to adaptively perform notification in accordance with a detection position of the sensor, detection contents, and the like, for example, on the basis of a location where an abnormality is detected, whether or not a fire has occurred, and the like, while coping with the change of the position of an object to be detected.

An object of this disclosure is to be capable of simply constructing a system by flexibly coping with any disposition of an object to be detected and to stably acquire detection information. Another object of this disclosure is to simply construct a system capable of performing adaptive notification in accordance with a detection position of a sensor, detection contents, and the like.

CITATION LIST

Patent Literature

PTL 1: Japanese Patent No. 5146276

SUMMARY OF THE INVENTION

A sensor network system according to this disclosure includes a sensor master device which receives detection information obtained by a sensor, a data server which acquires detection information from the sensor master device, and a notification device which receives notification information from the data server to perform notification, in which the sensor master device is connected to the sensor by wireless communication, in which the sensor master device and the data server are connected to each other by wired communication including power line communication, in which the data server and the notification device are connected to each other by wired communication in which at least a portion of a communication route includes power line communication, through the sensor master device, and in which the detection information for at least one of an object to be notified and notification contents, on the basis of the acquired detection information.

According to this disclosure, it is possible to simply construct a system by flexibly coping with any disposition of an object to be detected and to stably acquire detection information.

BRIEF DESCRIPTION OF DRAWINGS

FIG. 7A is a diagram showing an operation during the collecting of sensor data.

FIG. 7B is a diagram showing an operation when alert notice is given.

FIG. 7C is a diagram showing an operation during a voice call.

FIG. 10 is a diagram showing an example of a sensor management table that stores management data for managing a sensor.

FIG. 11 is a diagram showing an example of an apparatus management table that stores management data for managing apparatuses such as a sound terminal and a notification device.

DESCRIPTION OF EMBODIMENTS

Hereinafter, embodiments specifically describing a sensor network system according to this disclosure will be described in detail by appropriately referring to the accompanying drawings. Here, an excessively detailed description may be omitted. For example, detailed description of already well-known matters and repeated description of substantially the same configurations may be omitted. This is to avoid making the following description unnecessarily redundant and to facilitate the understanding by those skilled in the art. The accompanying drawings and the following description are provided so that a person skilled in the art can fully understand the present disclosure, and are not intended to limit subject matters described in claims.

In the embodiment, as an example of a sensor network system, a configuration example of a system is described which is configured such that a sensor and a sensor master device are provided in an area to be detected of a large-scale facility such as a factory or a building and which is configured to acquire detection information detected by the sensor and perform notification in accordance with detection contents. However, the embodiment of the sensor network system according to this disclosure is not limited to contents of the embodiment to be described later.

(Overall Configuration of System)

Figure 1:
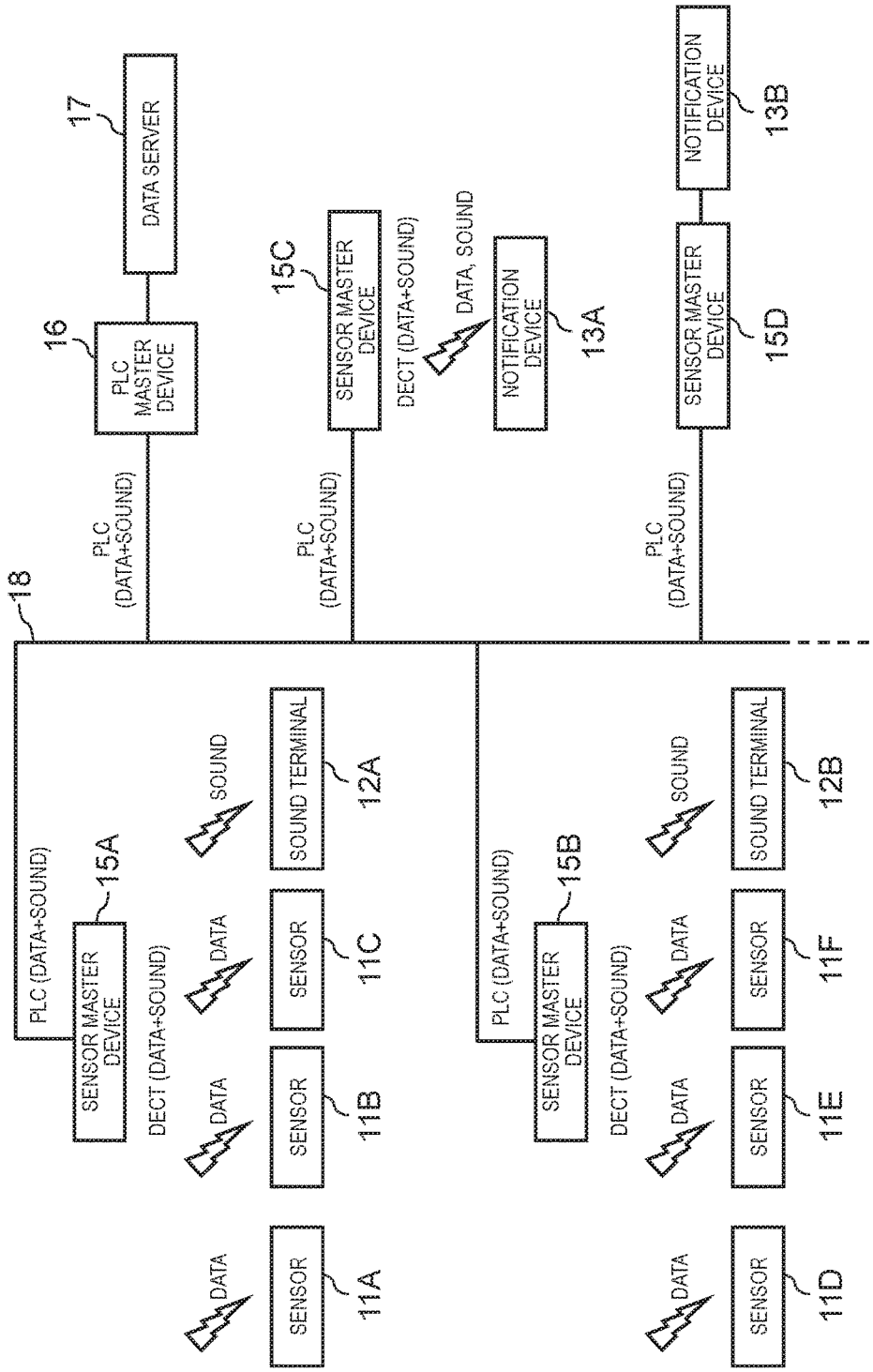
FIG. 1 is a diagram showing an example of a configuration of a sensor network system according to the embodiment.

FIG. 1 is a diagram showing an example of a configuration of a sensor network system according to the embodiment. The sensor network system includes sensors 11 (represented by plurality of sensors 11A, 11B, 11C, 11D, 11E, and 11F) which detect various states, and sensor master devices 15 (represented by plurality of sensor master devices 15A, 15B, 15C, and 15D) which acquire detection information from sensors 11. Sensors 11 and sensor master devices 15 are wirelessly connected to each other, and perform wireless communication between apparatuses to transmit and receive data including the detection information.

The wireless communication between the sensor 11 and the sensor master device 15 is performed using a wireless communication system such as Digital Enhanced Cordless Telecommunications (DECT). In this case, sensor 11 includes a detector that detects various states such as temperature, humidity, smoke, gas, and fire, and a DECT communication unit that transmits detection information indicating a detected state in accordance with a wireless signal of DECT. Sensor 11 includes a transmitter that transmits radio waves, and a position sensor that detects a position on the basis of the reception intensity of a signal transmitted from sensor 11 in sensor master device 15 to detect the position of an object including sensor 11. Sensor master device 15 controls communication with sensor 11 wirelessly connected thereto, and acquires detection information transmitted from each sensor 11.

The sensor network system includes sound terminals 12 (represented by plurality of sound terminals 12A and 12B) which are capable of performing a voice call by wireless communication, and notification devices 13 (represented by plurality of notification devices 13A and 13B) which perform notification based on the detection information (state and the like) which is obtained by sensor 11. Sound terminal 12 includes a microphone, a speaker, a COder/DECoder (CODEC) block, a Digital Signal Processor (DSP), and a DECT communication unit that transmits a sound signal in accordance with a wireless signal of DECT. Sound terminal 12 is wirelessly connected to sensor master device 15, and performs wireless communication with an apparatus to transmit and receive a sound signal for a private telephone and various pieces of data. Sound terminal 12 may also have a function as a sensor that transmits detection information in accordance with the sound signal. Sensor master device 15 controls communication with sound terminal 12 wirelessly connected thereto, transmits and receives a sound signal to and from specific sound terminal 12 to communicate therewith, and enables a call using a private telephone.

Notification device 13 includes a speaker for performing various notifications, a display device (a display, an LED display, or the like), a communication unit (a wireless communication unit or a wired communication unit of DECT) which receives notification information, and the like. Notification device 13 is connected to sensor master device 15 in a wireless or wired manner, and performs wireless communication or wired communication with an apparatus to receive data including notification information, or a sound signal. Sensor master device 15 controls communication with notification device 13 which is connected thereto in a wireless or wired manner, and transmits notification information or a sound signal to specific notification device 13 which serves as an object to be notified. Sound terminal 12 may also have a function as a notification device that receives notification information in accordance with the sound signal. Notification device 13 executes adaptive notification on at least one of an object to be notified and notification contents in response to detection information such as a detection position and a detection state.

Sensor master device 15 is connected to power line 18 as a communication line, and is connected to Power Line Communications (PLC) master device 16 through power line 18. In a case where plurality of sensor master devices 15 are provided, sensor master devices 15A, 15B, 15C, and 15D and PLC master device 16 are connected to each other through power line 18. Power line 18 to be used may be a wiring of a commercial power supply that supplies power to various apparatuses or illumination devices which are provided at a location where the sensor network system is installed. The communication line to be used may be a wiring such as a coaxial line, instead of power line 18. Sensor master device 15 and PLC master device 16 perform wired communication through PLC, and transmit and receive data including detection information and notification information, and a sound signal. Sensor master device 15 has a wireless communication function based on DECT or the like, and a wired communication function based on PLC. A configuration of sensor master device 15 will be described later.

PLC master device 16 controls communication with sensor master device 15 connected thereto through power line 18, collects data transmitted from sensor master device 15, and transmits data to specific sensor master device 15 which is a transmission destination. A configuration of PLC master device 16 will be described later.

PLC master device 16 is connected to data server 17, and transmits and receives data to and from data server 17. Communication between PLC master device 16 and data server 17 is performed by wired communication such as Ethernet (registered trademark), a USB, or RS-232C. Data server 17 acquires data, including detection information detected by sensor 11, through sensor master device 15 and PLC master device 16, and stores and accumulates the acquired data in a memory or a storage. Data server 17 determines that a predetermined state has been set or a predetermined event such as an abnormality has been detected on the basis of the detection information detected by sensor 11, and transmits data including the corresponding notification information. The notification information from data server 17 is transmitted to notification device 13, which is a transmission destination, through PLC master device 16 and sensor master device 15. A configuration of data server 17 will be described later.

The number of each of sensor 11, sensor master device 15, sound terminal 12, and notification device 13 to be provided may be a singular number or may be a predetermined plural number in accordance with a location where the sensor network system is installed.

(First System Configuration Example)

Figure 2:
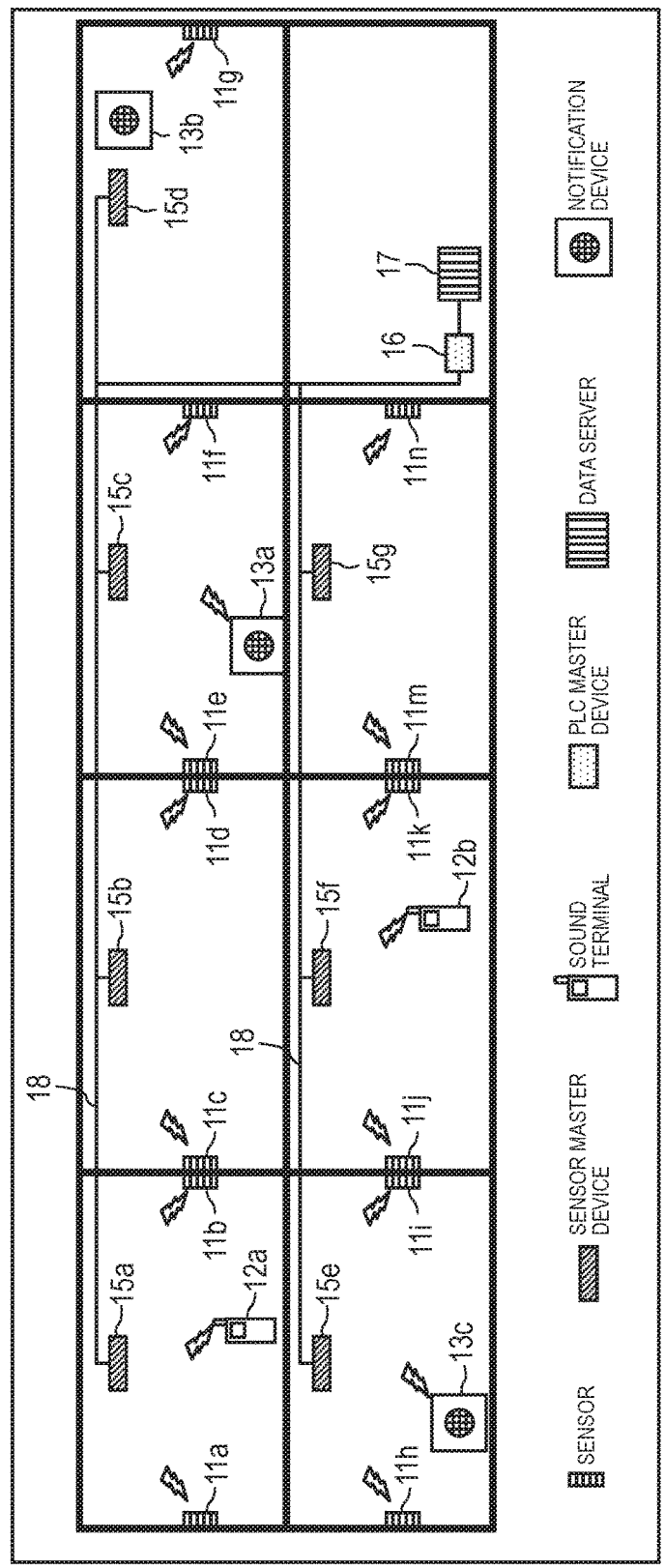
FIG. 2 is a diagram showing a specific configuration example of the sensor network system according to the embodiment.

FIG. 2 is a diagram showing a specific configuration example of the sensor network system according to the embodiment. FIG. 2 shows a configuration example in which sensor 11 and sensor master device 15 are provided in each of a plurality of rooms provided in two floors of first and second floors, and sensor master devices 15 and PLC master device 16 are connected to each other by power line 18.

In an area to be detected, each of sensors 11*a*, 11*b*, 11*c*, 11*d*, 11*e*, 11*f*, and 11*g* is installed on a wall or the like in each room of the second floor, and each of sensors 11*h*, 11*i*, 11*j*, 11*k*, 11*m*, and 11*n* is installed on a wall or the like in each room of the first floor. Sensors 11*a* to 11*n* obtain a driving power by a battery or energy harvesting to execute a detection operation and a wireless communication operation. Sensors 11*a* to 11*n* may be driven by another external power supply such as a commercial power supply from power line 18. Notification devices 13*a*, 13*b*, and 13*c* are appropriately installed within a building. Sound terminals 12*a* and 12*b* are appropriately positioned within an area to be detected.

Each of sensor master devices 15*a*, 15*b*, 15*c*, 15*d*, 15*e*, 15*f*, and 15*g* is installed on the ceiling of each room. Sensors 11*a* to 11*n*, sound terminals 12*a* and 12*b*, and notification devices 13*a* to 13*c* are connected to sensor master devices 15*a* to 15*g* in a wireless or wired manner. In the example shown in the drawing, a configuration is shown in which only notification device 13*b* is connected to sensor master device 15*d* in a wired manner, and each of the other notification devices is wirelessly connected to any one of sensor master devices 15*a* to 15*g*. However, any one of the sensor, the sound terminal, and the notification device may be directly connected to the sensor master device in a wired manner. Sensor master devices 15*a* to 15*g* are connected to power line 18 wired inside the ceiling of each room. Sensor master devices 15*a* to 15*g* are driven by a commercial power supply transmitted from power line 18, but may be driven with a built-in battery as a power supply.

PLC master device 16 and data server 17 are installed in a monitoring room, PLC master device 16 is connected to power line 18 wired inside the wall, and PLC master device 16 and data server 17 are connected to each other in a wired manner. Data or sound signals received from sensor master devices 15*a* to 15*g* are transmitted to PLC master device 16, and are transmitted to data server 17 from PLC master device 16. The data or the sound signals transmitted from data server 17 are transmitted to a predetermined sensor master device which is a transmission destination by PLC master device 16.

For example, in a case where an abnormality is detected by specific sensor 11*c*, data server 17 determines a notification device (for example, notification device 13*a* which is present in the vicinity of the detection position), which is set in advance in accordance with a location where the abnormality is detected, to be an object to be notified, and transmits notification information to the notification device. In this case, an area to be notified based on the detection position may be determined to transmit the notification information to the notification device which is present in the area to be notified. Data server 17 transmits notification information having contents, which are set in advance in accordance with the detected state, to the notification device which serves as an object to be notified. It is also possible to simultaneously notify notification devices of an abnormality (alert) by data server 17 during the occurrence of an earthquake, or the like. The guidance of an evacuation route, or the like based on a position in a case where an abnormality such as a fire occurs may be set to be notification information in accordance with the position of notification device 13 to execute notification based on a notification location.

Sensors 11*a* to 11*n* is driven by a battery or energy harvesting and perform wireless communication with sensor master devices 15*a* to 15*g* to be capable of being freely installed at a desired location. Sensor master devices 15*a* to 15*g* and PLC master device 16 perform wired communication through PLC so that it is possible to perform stable communication in a wide range exceeding the floor, wall, and the like in an area to be detected. It is possible to unify communication systems that not only perform the collecting of detection information but also not only a voice call and notification (notification of the present state, an abnormality notification during the occurrence of an abnormality, and the like) by performing bidirectional communication between apparatuses of the sensor network system.

In a case where sensor master devices 15*a* to 15*g* are configured to be driven by a battery, the sensor master devices can be operated for a fixed period of time even in a case of a power failure. In this case, sensor master devices 15*a* to 15*g* monitor a voltage which is input from power line 18, and transmit a detected signal to PLC master device 16 in a case where a power failure or the breaking of a breaker is detected. Thereby, it is possible to monitor a power failure state in the monitoring room. Sensor master devices 15a to 15g each having a PLC communication unit are provided a zero-cross detection circuit that detects a zero-cross point of AC power to be supplied to power line 18, in order to noise synchronized with a power supply frequency of the AC power and reduce the noise. It is possible to detect a power failure by non-detection of a zero-cross point and to realize a voltage monitoring function of the system by using the zero-cross detection circuit, without newly providing a power failure detection circuit.

In a case where wireless communication is performed between sensors 11a to 11n and sensor master devices 15a to 15g, a data transmission request is transmitted to only sensor master device 15 which is selected every time by data server 17 so that plurality of sensor master devices 15a to 15g do not mutually interfere with each other. When sensor master device 15 receives the data transmission request from data server 17, the sensor master device receives a signal from sensor 11 which is in a communication range of the device. Data server 17 determines correspondence (association, pairing) between sensor 11 and sensor master device 15 in accordance with the position of sensor 11, and manages each sensor in accordance with a sensor management table. The sensor management table will be described later. Data server 17 transmits the data transmission request to specific sensor master device 15 on the basis of the sensor management table, and sensor master device 15 having received the data transmission request receives a signal from sensor 11 which is associated with the device. Thereby, it is possible to reduce mutual interference between sensor master devices 15a to 15g and to improve a transmission characteristic in wireless communication.

(Second System Configuration Example)

Figure 3:
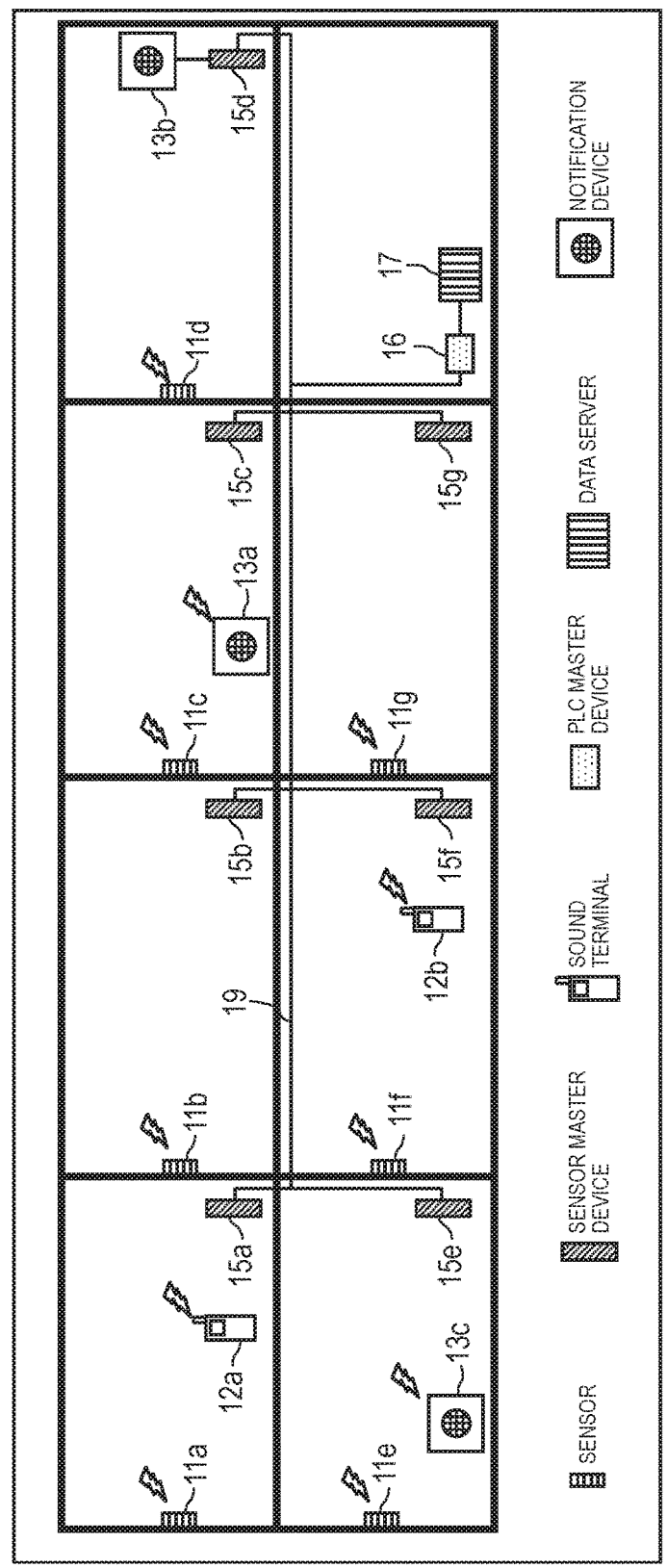
FIG. 3 is a diagram showing a specific another configuration example of the sensor network system according to the embodiment.

FIG. 3 is a diagram showing a specific another configuration example of the sensor network system according to the embodiment. FIG. 3 is a modification example of FIG. 2, and shows a configuration in which coaxial line 19 is used as a communication line, instead of power line 18.

In an area to be detected, each of sensors 11a, 11b, 11c, and 11d is installed on a wall or the like in each room of a second floor, and each of sensors 11e, 11f, and 11g is installed on a wall or the like in each room of a first floor. Each of sensor master devices 15a, 15b, 15c, 15d, 15e, 15f, and 15g is installed on a wall or the like in each room, and sensors 11a to 11g, sound terminals 12a and 12b, and notification devices 13a to 13c are connected to sensor master devices 15a to 15g in a in a wired or wireless manner.

Sensor master devices 15a to 15g are connected to coaxial line 19 wired inside the wall, floor, or ceiling of each room. In a case where coaxial line 19, such as an antenna cable for watching TV, is wired within a building, it is possible to perform wired communication between sensor master devices 15a to 15g and PLC master device 16 by using coaxial line 19, similar to power line 18. In this case, power may be supplied to sensor master devices 15a to 15g and PLC master device 16, which are connected to coaxial line 19, through the coaxial line or another power supply line. Also in a configuration using coaxial line 19, it is possible to execute the collecting of detection information of the sensors, a voice call, and notification based on detection conditions by using wireless communication through DECT or the like and wired communication through PLC, similar to the case of power line 18.

(Configuration Example of Sensor Master Device)

Figure 4:
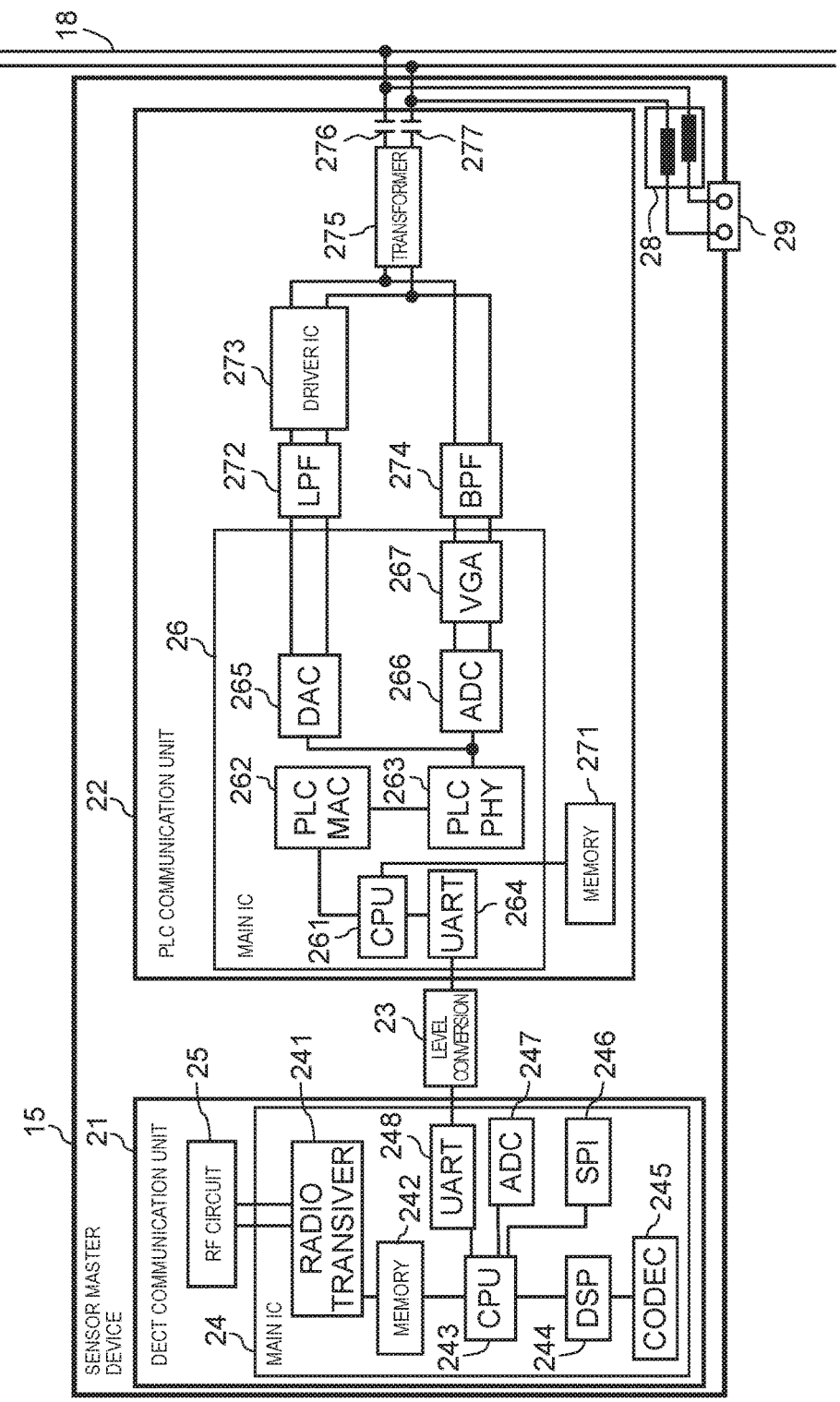
FIG. 4 is a block diagram showing a configuration example of a sensor master device.

FIG. 4 is a block diagram showing a configuration example of sensor master device 15. Sensor master device 15 includes DECT communication unit 21 and PLC communication unit 22. DECT communication unit 21 and PLC communication unit 22 are connected to each other through level conversion circuit 23, and are configured to be capable of transmitting data to each other between two communication units. PLC communication unit 22 of sensor master device 15 is connected to power line 18.

PLC communication unit 22 includes main Integrated Circuit (IC) 26, memory 271, low pass filter (LPF) 272, driver IC 273, band pass filter (BPF) 274, transformer 275, and coupling capacitors 276 and 277.

Main IC 26 includes Central Processing Unit (CPU) 261, Power Line Communication-Media Access Control layer (PLC•MAC) block 262, Power Line Communication-Physical layer (PL.C•PHY) block 263, and Universal Asynchronous Receiver Transmitter (UART) block 264. Main IC 26 includes Digital to Analog Converter (DAC) 265, Analog to Digital Converter (ADC) 266, and Variable Gain Amplifier (VGA) 267.

CPU 261 controls operations of PLC•MAC block 262 and PLC•PHY block 263 and controls the entire PLC communication unit 22 by using programs and data which are stored in memory 271. PLC•MAC block 262 manages MAC layers of a transmitted signal and a received signal. PLC•PHY block 263 manages PHY layers of a transmitted signal and a received signal. UART block 264 is an interface for asynchronously performing serial communication, and transmits and receives data between CPU 261 and a processor of DECT communication unit 21.

In PLC communication unit 22, DA converter 265, low pass filter 272, and driver IC 273 are connected to an output end of PLC•PHY block 263 as circuits for transmission. In PLC communication unit 22, AD converter 266, variable gain amplifier 267, and band pass filter 274 are connected to an input end of PLC•PHY block 263 as circuits for reception.

Driver IC 273 and band pass filter 274 are connected to one end of transformer 275, and the other end of transformer 275 is connected to power line 18 through coupling capacitors 276 and 277.

Main IC 26 is an electric circuit (Large Scale Integration: LSI) which performs signal processing including basic control or modulation and demodulation for performing, for example, data communication, similar to a general modem. For example, main IC 26 modulates data which is transmitted from DECT communication unit 21 and input through level conversion circuit 23, and outputs the modulated data to power line 18 side as a transmitted signal (data). Main IC 26 demodulates the signal which is transmitted and input from power line 18 side as a received signal (data), and outputs the demodulated signal to DECT communication unit 21 through level conversion circuit 23. Level conversion circuit 23 is a circuit that converts a high-level voltage between two circuits connected thereto. For example, in a case where the high level of PLC communication unit 22 is 3.3 V and the high level of DECT communication unit 21 is 1.8 V, level conversion circuit 23 performs level conversion so as to match the voltage of a signal of one circuit with the voltage of a signal of the other circuit.

DECT communication unit 21 includes main IC 24 and Radio Frequency (RF) circuit 25. Main IC 24 includes wireless transmission and reception circuit (RADIO TRANSCEIVER) 241, memory 242, CPU 243, Digital Signal Processor (DSP) 244, COder/DECoder (CODEC) block 245, Serial Peripheral Interface (SPI) block 246, AD converter (ADC) 247, and UART block 248.

CPU 243 controls the operation of wireless transmission and reception circuit 241 and controls the entire DECT communication unit 21 by using programs and data which are stored in memory 242. Data transmission is performed between memory 242 and CPU 243 by First-In First-Out (FIFO) processing. CODEC block 245 can be connected to a sound apparatus such as a microphone or a speaker, and encodes and decodes a sound signal. DSP 244 performs various processes on the encoded sound data. SPI block 246 can be connected to a digital output end of a sensor or the like, and performs serial/parallel conversion of an input digital signal. AD converter 247 can be connected to an analog output end of a sensor or the like, and converts an input analog signal into a digital signal. UART block 248 cooperates with UART block 264 of PLC communication unit 22 described above to transmit and receive data to and from the processor of PLC communication unit 22.

Wireless transmission and reception circuit 241 includes signal processing circuits such as an encoding circuit and a decoding circuit, and executes wireless communication processing of a baseband band through a DECT communication system. RF circuit 25 includes wireless communication circuits such as an antenna, a frequency conversion circuit, a modulation circuit, and a demodulation circuit, and executes a transmission operation and a reception operation in a wireless frequency band corresponding to the DECT communication system. Main IC 24 performs signal processing of a received signal (data) which is received and input by wireless transmission and reception circuit 241, and outputs the processed signal to PLC communication unit 22 through level conversion circuit 23. Main IC 24 performs signal processing of data which is transmitted from PLC communication unit 22 and input through level conversion circuit 23, outputs the processed data to wireless transmission and reception circuit 241 as a transmitted signal (data), and transmits the output data from wireless transmission and reception circuit 241.

With the above-described configuration, sensor master device 15 wirelessly communicates with sensor 11, sound terminal 12, and notification device 13 by DECT communication unit 21, collects detection information from sensor 11, transmits and receives a sound signal to and from sound terminal 12, and transmits notification information to notification device 13. Sensor master device 15 communicates with PLC master device 16 in a wired manner by PLC communication unit 22, and transmits detection information, a sound signal, and notification information to data server 17 connected to PLC master device 16.

In sensor master device 15, impedance upper 28 including a coil is connected to power line 18 in parallel with PLC communication unit 22, and outlet 29 for an external power supply is provided through impedance upper 28. Outlet 29 may be provided at a location where an illumination is installed on a ceiling, may be provided on a floor or a wall, or the like. A power supply line of a peripheral apparatus, such as an illumination device or an electronic apparatus, is connected to outlet 29 which is an external terminal through impedance upper 28 so as to increase the impedance of the peripheral apparatus seen from PLC communication unit 22. Thereby, it is possible to reduce the attenuation of a communication signal of power line communication and the influence of noise from the peripheral apparatus, and to improve a signal transmission characteristic during the power line communication.

(Configuration Example of PLC Master Device)

Figure 5:
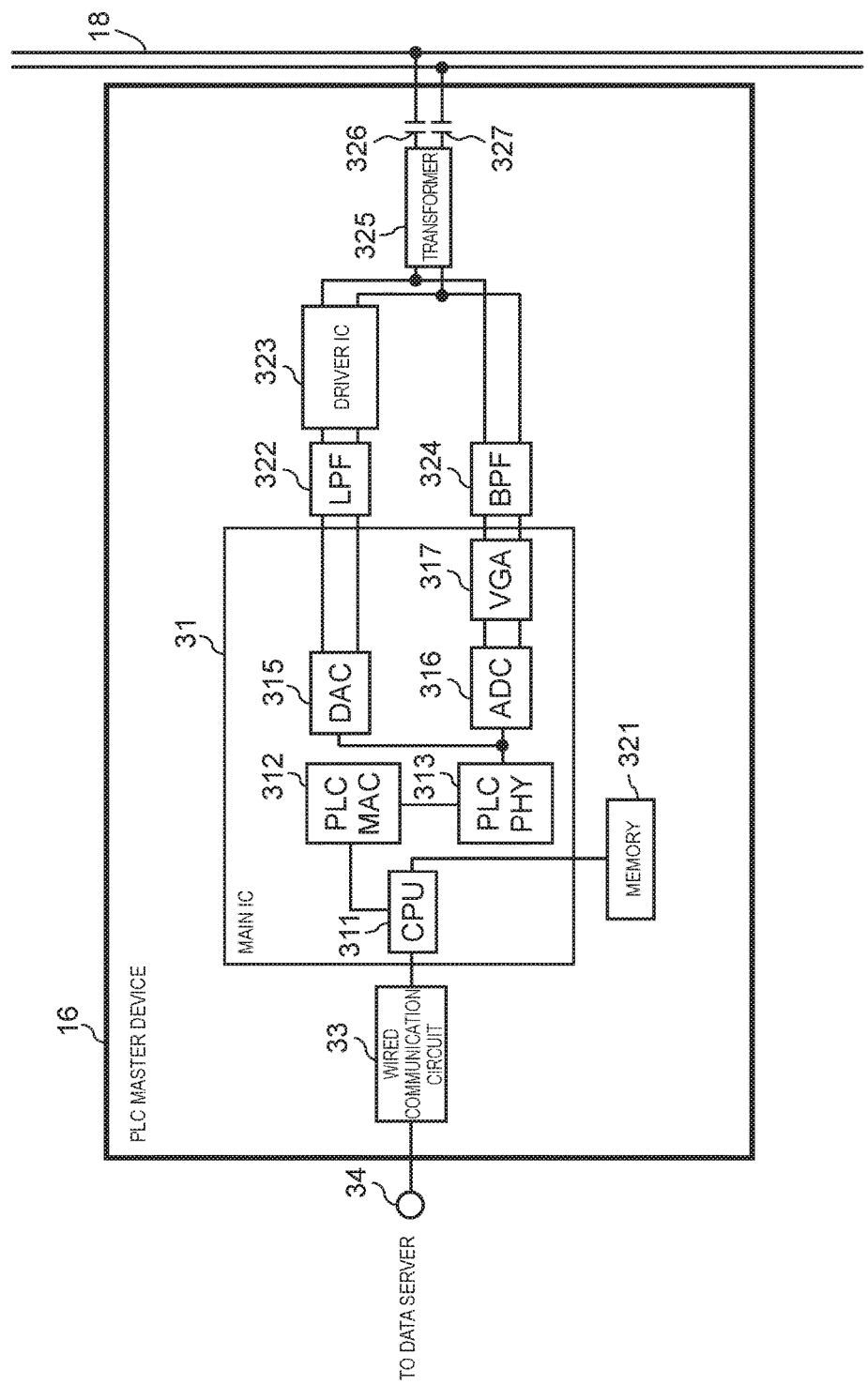
FIG. 5 is a block diagram showing a configuration example of a PLC master device.

FIG. 5 is a block diagram showing a configuration example of PLC master device 16. PLC master device 16 includes a PLC communication unit performing wired communication through PLC, and is connected to power line 18. PLC master device 16 includes wired communication circuit 33 performing wired communication with data server 17, and is connected to data server 17 through connection terminal 34 for wired communication and a communication cable.

PLC master device 16 includes main IC 31, memory 321, low pass filter (LPF) 322, driver IC 323, band pass filter (BPF) 324, transformer 325, and coupling capacitors 326 and 327 as PLC communication units. Main IC 31 includes CPU 311, PLC•MAC block 312, PLC•PHY block 313, DA converter (DAC) 315, AD converter (ADC) 316, and variable gain amplifier (VGA) 317. The PLC communication unit is a circuit that has the same configuration and function as those of PLC communication unit 22 of sensor master device 15 shown in FIG. 4, and thus a description of a repeated portion will be omitted.

Main IC 31 demodulates a signal which is transmitted and input from power line 18 side as a received signal (data), and outputs the demodulated signal to wired communication circuit 33. Main IC 31 modulates data which is transmitted and input from wired communication circuit 33, and outputs the modulated data to power line 18 side as a transmitted signal (data). Wired communication circuit 33 is a circuit constituting a communication interface such as Ethernet (registered trademark), a USB, or RS-232C, and executes data transmission between data server 17 and PLC master device 16. PLC master device 16 may include a wireless communication unit that wirelessly communicates with data server 17 and another device such as a monitoring terminal.

(Configuration Example of Data Server)

Figure 6:
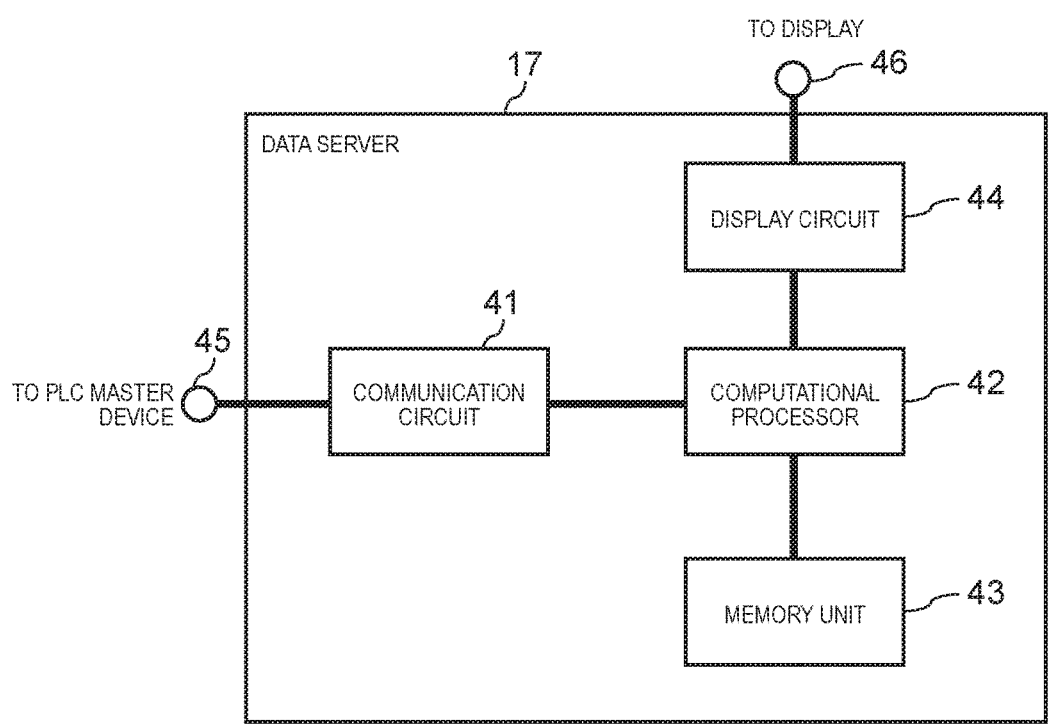
FIG. 6 is a block diagram showing a configuration example of a data server.

FIG. 6 is a block diagram showing a configuration example of data server 17. Data server 17 is constituted by a computer including a CPU, a memory, a storage, a communication interface, and the like, as a hardware configuration. Data server 17 includes communication circuit 41, computational processor 42, memory unit 43, and display circuit 44.

Data server 17 is connected to PLC master device 16 through connection terminal 45 for wired communication and a communication cable. Communication circuit 41 is a circuit constituting a communication interface such as Ethernet (registered trademark), a USB, or RS-232C in response to wired communication circuit 33 of PLC master device 16, and executes data transmission between data server 17 and PLC master device 16.

Computational unit 42 is configured to include a CPU, a Random Access Memory (RAM), a Read Only Memory (ROM), and the like, and executes computational processing related to the operation of data server 17 in accordance with a predetermined software program. Memory unit 43 is configured to include a storage such as a flash memory or a hard disk drive, and stores and accumulates various pieces of data in the sensor network system. Although details will be described later, memory unit 43 stores a sensor management table storing management data for managing sensor 11 within an area to be detected, an apparatus management table storing management data for managing apparatuses such as sound terminal 12 and notification device 13, and the like.

Data server 17 is connected to a display as a display monitor which is constituted by a Liquid Crystal Display (LCD) or an organic Electroluminescence (EL) through connection terminal 46 for outputting video and a video cable. Display circuit 44 performs signal processing of display data which is output from computational processor 42 to generate a video signal for screen display, and outputs the generated video signal to the display. Various pieces of information regarding the collecting of detection information and the distribution of notice information, such as the sensor management table, disposition conditions of the sensor, and notification contents for the notification device, are displayed on the display.

(Description of Outline of System Operation)

FIGS. 7A to 7C are diagrams showing a flow of data in the sensor network system according to the embodiment. FIG. 7A is a diagram showing an operation during the collecting of sensor data, FIG. 7B is a diagram showing an operation when alert notice is given, and FIG. 7C is a diagram showing an operation during a voice call.

As shown in FIG. 7A, in a case where sensor data is collected, data of detection information is transmitted from sensor 11 to data server 17. In this case, sensor 11 transmits detection information of various states such as temperature, humidity, smoke, gas, and fire to sensor master device 15 which is associated (paired) with each sensor 11. When sensor master device 15 receives detection information from sensor 11 which is registered in the device, the sensor master device transmits the received detection information to PLC master device 16. PLC master device 16 receives the detection information from sensor master device 15 and transmits the received detection information to data server 17. Thereby, the detection information detected in sensor 11 is collected and stored in data server 17.

Data server 17 determines the state of each unit within an area to be detected on the basis of the collected detection information, and transmits notification information regarding a notification for a normal state or an abnormal state to the notification device to perform notification. As shown in FIG. 7B, in a case where alert notice is given, data of notification information for alert notice or a sound signal is transmitted from data server 17 to notification device 13. In this case, when data server 17 satisfies predetermined conditions when giving alert notice for an abnormal state, data of notification information for alert notification or a sound signal is transmitted to PLC master device 16. PLC master device 16 receives the notification information from data server 17, and transmits the received notification information to sensor master device 15 which is associated with notification device 13 which serves as an object to be notified. When sensor master device 15 receives the notification information to notification device 13 registered in the device, the sensor master device transmits the received notification information to corresponding notification device 13. Thereby, notification information of alert notice is transmitted to notification device 13, which is an object to be notified, in accordance with detection information to give the alert notice.

As shown in FIG. 7C, when a voice call is performed, a sound signal is bidirectionally transmitted between plurality of sound terminals 12A and 12B. Here, only one-directional signal transmission will be described. Sound terminal 12A transmits a sound signal for a call to sensor master device 15A which is associated (paired) with the device. Sensor master device 15A transmits the sound signal to data server 17 through PLC master device 16. Data server 17 transmits the sound signal to sensor master device 15B which is associated with sound terminal 12B, which is an opponent for the call, through PLC master device 16. When sensor master device 15B receives the sound signal to sound terminal 12B registered in the device, the sensor master device transmits the received sound signal to sound terminal 12B. Thereby, the sound signal is transmitted and received between plurality of sound terminals 12A and 12B, and thus the voice call is performed. In this case, data server 17 executes processing such as call control related to a private telephone.

(Processing Example of Collecting of Detection Information and Transmission of Notification Information)

Figure 8:
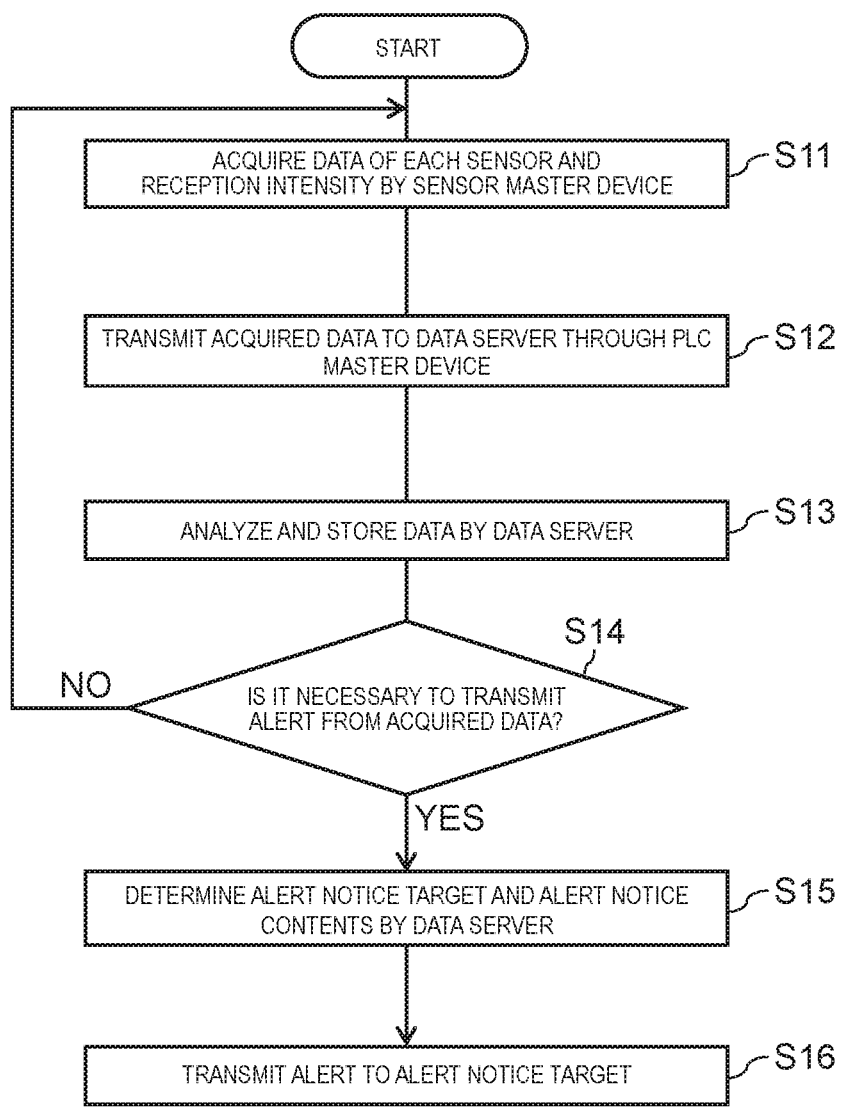
FIG. 8 is a flowchart showing processing related to the collecting of sensor data and alert notice in the embodiment.

FIG. 8 is a flowchart showing processing related to the collecting of sensor data and alert notice in the embodiment. Sensor master device 15 acquires the reception intensity of data of detection information obtained by each sensor 11 registered in the device and a signal which is transmitted from each sensor 11 (step S11). Sensor master device 15 transmits the acquired data of detection information to data server 17 through PLC master device 16 (step S12). Data server 17 analyzes the data of detection information which is acquired from each sensor 11, and stores the acquired data (step S13).

Data server 17 determines whether or not predetermined conditions for giving alert notice are satisfied on the basis of an analysis result of the acquired data, and determines whether or not it is necessary to transmit an alert (step S14). Here, in a case where it is determined that it is necessary to transmit an alert, data server 17 determines an alert notice target, and alert notice contents (step S15). Data server 17 transmits an alert to the alert notice target, and transmits notification information of alert notice to notification device 13 which is an alert notice target through PLC master device 16 and sensor master device 15 (step S16).

Examples of a case where it is necessary to transmit an alert include a case where a fire alarm rings at a predetermined location, a case where an emergency button is pressed, a case where a gas is detected, a case where temperature rises abnormally, a case where a person or an object, which is to be detected, is not present in its expected place (present in an abnormal place), and the like. Examples of a case where it is not necessary to transmit an alert include a case where there is no temperature abnormality at a predetermined location, a case where a person or an object, which is to be detected, is present in a normal place, and the like.

As a mode of alert notice to be transmitted to notification device 13, data such as display data or ringing data, a sound signal, and the like are used. Examples of the display data include characters or an image showing abnormality contents to be reported to a target person, an image of an evacuation route corresponding to a detection position or abnormality contents, and the like.

When notification, such as alert notice, is performed in accordance with detection information, it is also possible to perform notification by using not only detection information from sensor 11 but also a sound signal of a reporter's reporting of an abnormality from sound terminal 12 as the detection information. In this case, the reporter having found the abnormality transmits a signal to a monitoring terminal (for example, monitoring terminal 48 shown in FIG. 12) in a monitoring room by a call of a private telephone using sound terminal 12 to report the abnormality. Sound terminal 12 may be provided with an urgency notification button or the like to enable an urgency call. When the monitoring person receives notice of the sound signal from sound terminal 12 by the monitoring terminal provided in the monitoring room, the monitoring person manually selects and sets at which location and with what contents alert notice is to be given, and operates an alert transmission button of the monitoring terminal to transmit the alert notice. The monitoring terminal is constituted using, for example, a Personal Computer (PC), and functions as a display terminal and an operation terminal of data server 17 to enable the confirmation of the detection information and the notification information which are stored in data server 17, the management of an apparatus such as a sensor, the indication of alert notice, and the like.

Figure 9:
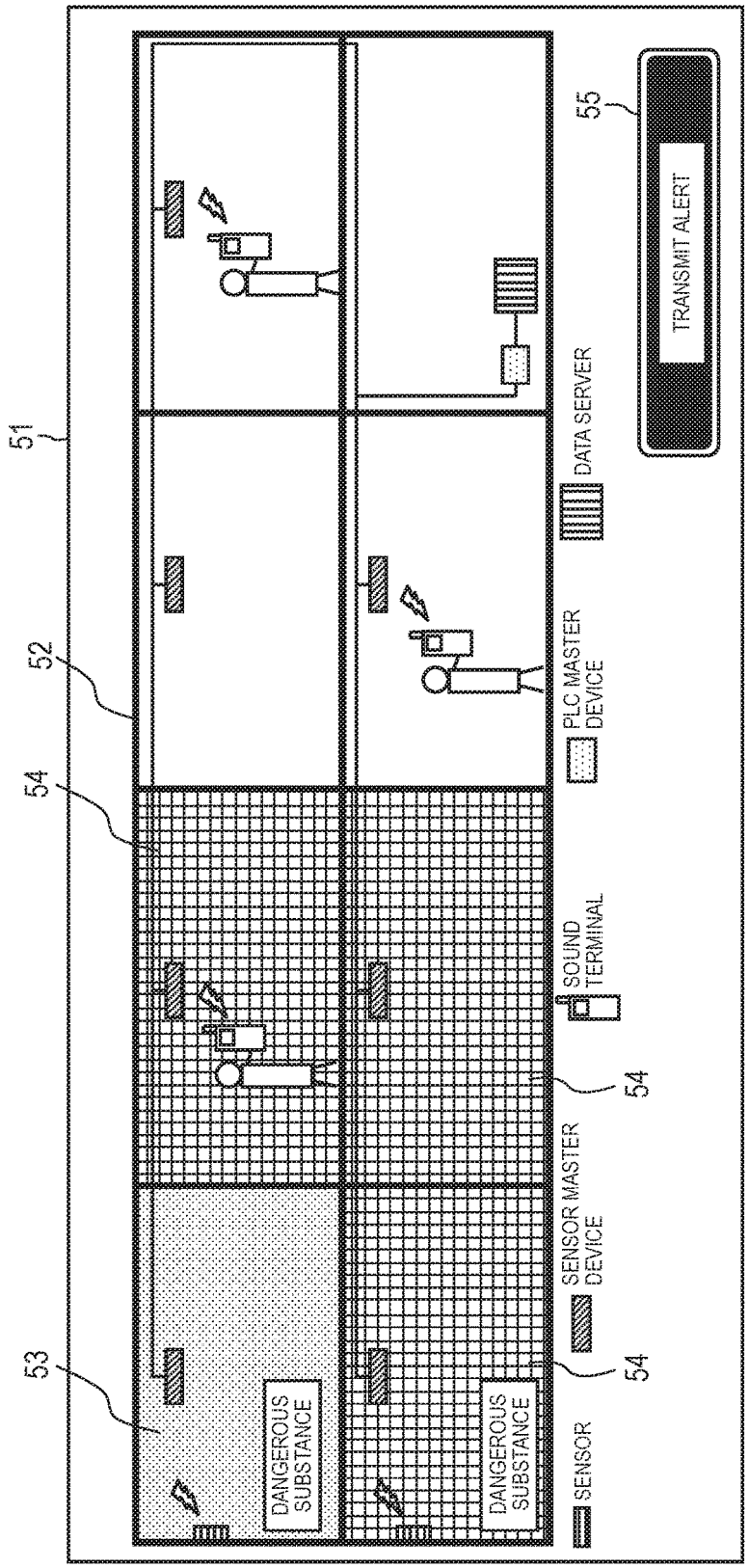
FIG. 9 is a diagram showing an example of an alert transmission screen displayed on a display unit of a monitoring terminal.

FIG. 9 is a diagram showing an example of an alert transmission screen displayed on a display unit of a monitoring terminal. Alert transmission screen 51 of the monitoring terminal is provided with layout display 52 in an area to be detected. In layout display 52, sensor reaction area 53 in which an abnormality is detected by sensor 11 and alert notice area 54 which is automatically or manually set in response to sensor reaction area 53 are indicated by a predetermined mark, color, shape, or the like. In the example shown in the drawing, sensor reaction area 53 is indicated by a dot shape, and alert notice area 54 is indicated by a lattice shape. This example shows a case where a dangerous substance leaks in a room at the left end in a second floor and is detected by a sensor, and a reporter in the next room reports an abnormality to a monitoring room by a sound terminal. A monitoring person selects and sets the vicinity of sensor reaction area 53 as alert notice area 54 through a touch screen of the monitoring terminal, or the like, and touches alert transmission button 55 to indicate alert notice. Data server 17 transmits notification information to a notification device located in alert notice area 54 and executes the alert notice in accordance with the monitoring person's indication operation.

Here, a specific example of a management table of sensor 11, sound terminal 12, notification device 13, and the like which are managed in data server 17 will be described. FIG. 10 is a diagram showing an example of a sensor management table that stores management data for managing sensor 11. FIG. 11 is a diagram showing an example of an apparatus management table that stores management data for managing apparatuses such as sound terminal 12 and notification device 13.

Data server 17 includes a sensor management table and an apparatus management table, and manages a sensor and an apparatus which wirelessly communicate with each other within an area to be detected. Sensors and other apparatuses may be managed by one management table.

The sensor management table includes a sensor ID, a sensor type, a sensor installation area, a sensor master device ID, a sensor reaction notice area, and a notice content. Data server 17 manages the state of each sensor for each sensor ID, and sets the corresponding operation. The sensor ID is individually allocated to each sensor. The sensor type indicates types such as a fire sensor and an emergency button.

The sensor master device ID indicates an ID of a sensor master device which is associated (paired) with the corresponding sensor. Each of sensors 11 wirelessly communicates with sensor master device 15 in the vicinity of the sensor, and data server 17 determines pairing of sensor 11 and sensor master device 15 which communicate detection information. Data including the detection information transmitted from sensor 11 is received by sensor master device 15 paired with the sensor, and is transmitted to PLC master device 16.

The sensor master device ID and the sensor installation area are determined by data server 17 on the basis of information of each sensor which is transmitted from each of sensor master devices 15 to data server 17. In a case where an installation location is changed by the movement of sensor 11, data server 17 changes and resets the sensor master device ID and the sensor installation area on the basis of the information of the sensor from each sensor master device 15, and updates the sensor management table.

A method of determining the sensor installation area is, for example, the following method. In a first method, an area including sensor master device 15 having the highest reception intensity, among reception intensities of signals received by sensors 11 in sensor master devices 15, which is acquired by data server 17 is determined to be a sensor installation area of the corresponding sensor 11. In a second method, three sensor master devices 15 having a higher reception intensity, among reception intensities of signals received by sensors 11 in sensor master devices 15, which is acquired by data server 17 are extracted, and three-point positioning is performed from the positions of three sensor master devices 15 to estimate a sensor installation area of the corresponding sensor 11. In a third method, pairing of sensor 11 and sensor master device 15 is fixedly set in advance from locations where sensors 11 are disposed, and the corresponding sensor 11 wirelessly communicates with a specific sensor master device 15.

The sensor reaction notice area is equivalent to an area to be notified, and indicates an alert notice area where alert notice is to be given, in a case where an abnormality or the like is detected by the reaction of the corresponding sensor. For example, in a case where a fire is detected by a fire sensor having a sensor ID of 02 which is installed in an area of 1F-A, detection information is transmitted to data server 17 through a sensor master device having a sensor master device ID of 91. In this case, as the alert notice area, 1F-A, B, C and 2F-A are set, and notification information is transmitted to a notification device located in this area.

When the sensor installation area is changed by the movement of sensor 11, data server 17 performs reset by changing the sensor reaction notice area in association with a change in the area of the sensor, and updates the sensor management table.

The notice content indicates contents when alert notice is given. For example, in a case where a fire is detected in the above-described area of 1F-A, alert notice of "Fire reaction in 1F-A Make sure of the scene immediately" is transmitted to the notification devices located in 1F-A, B, C and 2F-A, and alert notice is executed by the display of characters, a sound, or the like.

The apparatus management table includes an apparatus ID, an apparatus type, an apparatus installation area, and a sensor master device ID. Data server 17 manages the state of each apparatus such as notification device 13 for each apparatus ID, and sets the corresponding operation. The apparatus ID is individually allocated to each apparatus. The apparatus type indicates types such as a notification device and a sound terminal. The sensor master device ID indicates an ID of a sensor master device which is associated (paired) with the corresponding apparatus. Each of the apparatuses such as notification device 13 wirelessly communicates with sensor master device 15 in the vicinity of the apparatus, similar to sensor 11, and is paired with sensor master device 15 which is an opponent that transmits and receives data and the like.

In the example shown in the drawing, the sound terminal has a function as a sensor, and thus has management information in both the sensor management table and the apparatus management table, but management may be performed using only the sensor management table.

(Specific Example of Use Case)

Next, some use cases of the sensor network system according to the embodiment will be described.

Figure 12:
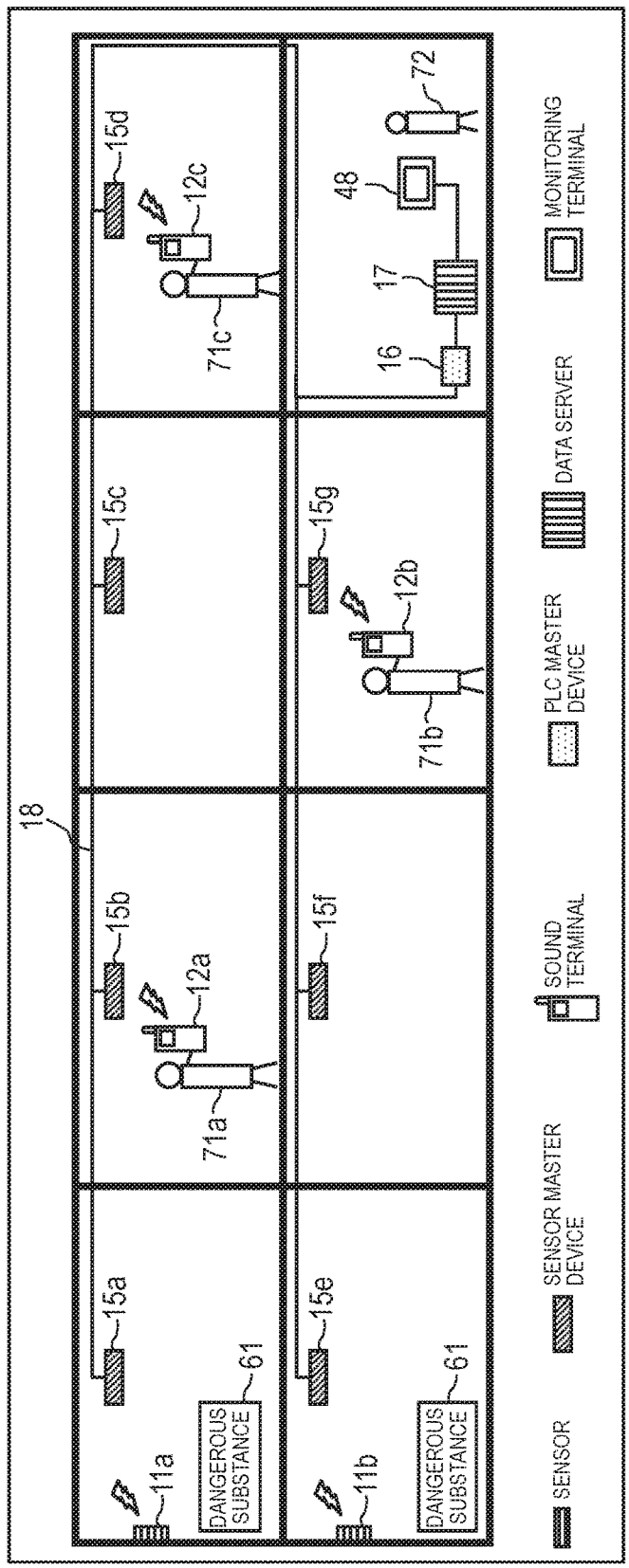
FIG. 12 is a diagram showing a configuration and operation of a system of a first use case.

FIG. 12 is a diagram showing a configuration and operation of a system of a first use case. The first use case is an example of a dangerous substance management system that monitors the leakage of an inflammable dangerous substance, such as a flammable gas, by a sensor.

In an area to be detected, sensor 11a is installed on a wall in a room at the left end of a second floor, and dangerous substance 61 is disposed in the room. Sensor 11b is installed on a wall in a room at the left end of a first floor, and dangerous substance 61 is disposed in the room. As the dangerous substance, a gas pipe, a chemical agent storage, a hydrogen station, and the like are assumed. Operator 71a having sound terminal 12a is present in the second room from the left of the second floor, operator 71b having sound terminal 12b is present in the second room from the right of the first floor, and operator 71c having sound terminal 12c is present in a room at the right end of the second floor.

Each of sensor master devices 15a, 15b, 15c, 15d, 15e, 15f, and 15g is installed on the ceiling of each room. Sensors 11a and 11b and sound terminals 12a to 12c are wirelessly connected to sensor master devices 15a to 15g. Sensor master devices 15a to 15g are connected to power line 18 wired inside the ceiling of each room, and are connected to PLC master device 16 through power line 18.

PLC master device 16 and data server 17 are installed in a monitoring room, PLC master device 16 is connected to power line 18 wired inside the wall, and PLC master device 16 and data server 17 are connected to each other in a wired manner. Monitoring terminal 48 including a display is connected to data server 17. Monitoring person 72 in the monitoring room visually monitors monitoring terminal 48, and gives alert notice and the like by operating the terminal in a case where an abnormality is detected.

In this case, when an abnormality such as gas leakage is detected by sensors 11a and 11b, data server 17 transmits alert notice based on a sound signal to sound terminals 12a to 12c of operators 71a to 71c, on the basis of detection information received from sensors 11a and 11b. For example, it is possible to adaptively notify sound terminals 12a to 12c of a request for confirming the situation in the scene, an evacuation indication, and the like, in accordance with a detection position and the state of an object to be detected. Here, alert notice may be transmitted to only a sound terminal located in the vicinity of the sensor having detected an abnormality, in accordance with the position of the sensor. For example, in a case where sensor 11a in the second floor has detected an abnormality, alert notice is given to sound terminal 12a located closest to the sensor in the second floor. In a case where sensor 11b in the first floor has detected an abnormality, alert notice is given to sound terminal 12b located in the first floor. Operators 71a to 71c having received the alert notice can cooperatively cope with the occurrence of an abnormality by performing a call between sound terminals 12a to 12c to keep in touch with each other. According to this example, it is possible to execute alert notice based on the position of an abnormality detected.

Figure 13:
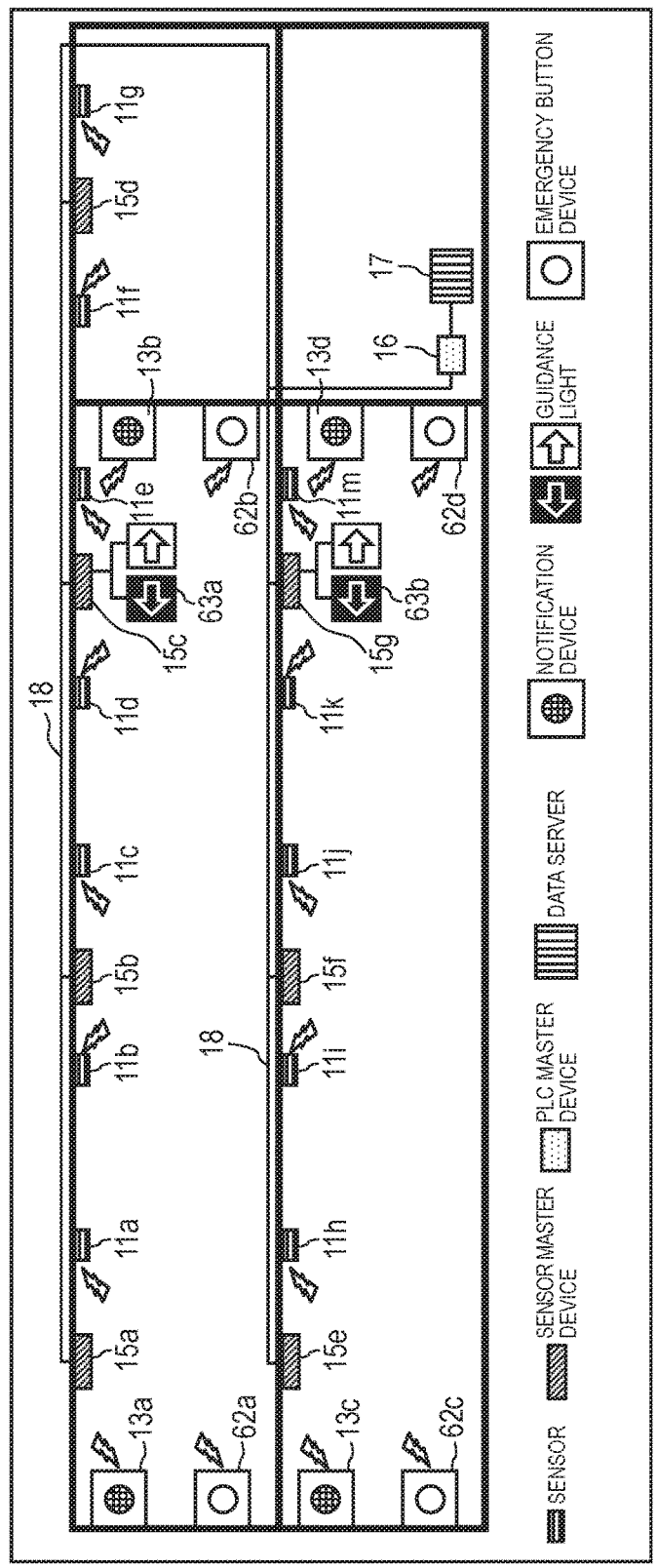
FIG. 13 is a diagram showing a configuration and operation of a system of a second use case.

FIG. 13 is a diagram showing a configuration and operation of a system of a second use case. The second use case is an example of an evacuation guidance system that detects the occurrence of a fire by the operation of a sensor or an emergency button device to perform evacuation guidance.

In an area to be detected, sensors 11a, 11b, 11c, 11d, 11e, 11f, and 11g are installed on the ceiling in a second floor, and sensors 11h, 11i, 11j, 11k, and 11m are installed on the ceiling in a first floor. Emergency button devices 62a and 62b and notification devices 13a and 13b are installed on the walls in the second floor, and emergency button devices 62c and 62d and notification devices 13c and 13d are installed on the walls in the first floor. Guide light 63a is installed at an upper portion of a room in the second floor, and guidance light 63b is installed at an upper portion of a room in the first floor.

Each of sensor master devices 15a, 15b, 15c, 15d, 15e, 15f, and 15g is installed on the ceiling of each room. Sensors 11a to 11m, emergency button devices 62a to 62d, and notification devices 13a to 13d are wirelessly connected to sensor master devices 15a to 15g, and guidance light 63a and guidance light 63b are respectively connected to sensor master device 15c and sensor master device 15g in a wired manner. Sensor master devices 15a to 15g are connected to power line 18 wired inside the ceiling of each room, and are connected to PLC master device 16 through power line 18. PLC master device 16 and data server 17 are installed in a monitoring room, PLC master device 16 is connected to power line 18 wired inside the wall, and PLC master device 16 and data server 17 are connected to each other in a wired manner.

In this case, when a fire is detected by the operation of sensor 11, such as a flame sensor, or emergency button device 62, data server 17 transmits alert notice to notification devices 13a to 13d and transmits a lighting indication to guidance lights 63a and 63b on the basis of detection information received from sensors 11a to 11m or emergency button devices 62a to 62d. Here, lighting patterns of guidance lights 63a and 63b are controlled in accordance with the position of the sensor having detected a fire, and notification contents such as a fire occurrence location and an evacuation route are determined to transmit evacuation broadcasting data to notification device 13a to 13d. Evacuation information including a sound indicating location for evacuation is transmitted to notification devices 13b and 13d in the vicinity of guidance lights 63a and 63b to perform sound guidance for a person who is to evacuate. The sound guidance is used, and thus it is possible to cope with a person with a handicap and to function as auxiliary means in a case where the guidance light is not seen due to permeation with smoke. In order to give alert notice and perform evacuation guidance based on a fire occurrence location, data server 17 may determine an alert notice area and notice contents by using the sensor management table shown in FIG. 10, and may execute alert notice processing and guidance light lighting processing.

Figure 14:
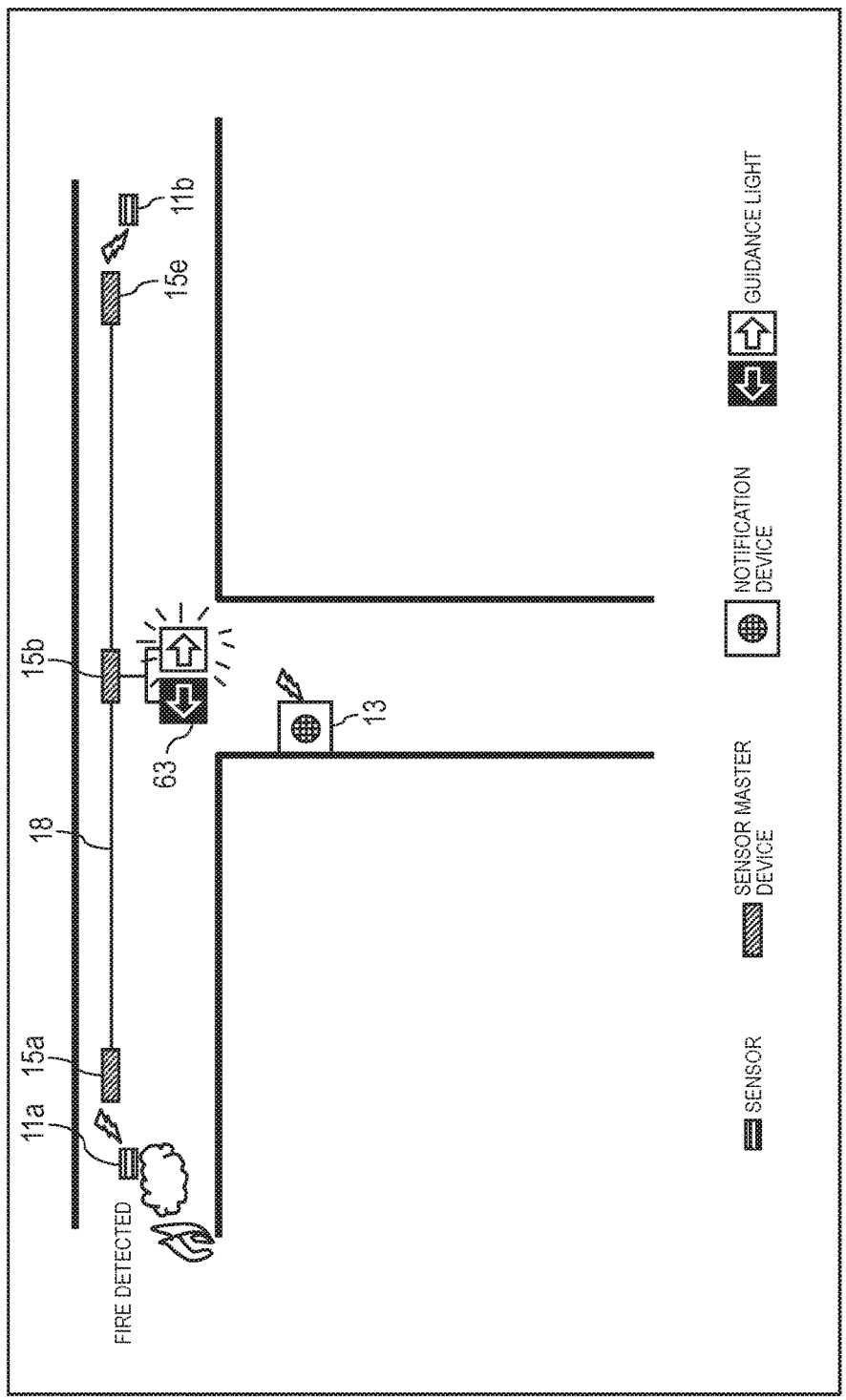
FIG. 14 is a diagram showing a specific example of evacuation guidance in the second use case.

FIG. 14 is a diagram showing a specific example of evacuation guidance in the second use case. For example, in a case where a passage is branched in a T-shape and a fire is detected on the left side when seen in front of a branch point of the passage, detection information regarding the detection of the fire is transmitted from sensor 11a, and is transmitted to data server 17 through sensor master device 15a. Data server 17 generates sound information for detecting a fire occurrence location and an evacuation route to transmit the generated sound information to notification device 13, and gives sound information to an evacuee from notification device 13 by using a sound. Data server 17 transmits a lighting control signal for lighting up an arrow in a right direction to guidance light 63 located in the vicinity of the branch point of the passage, and indicates a guidance path in a rightward direction opposite to the fire occurrence location from the branch point so as not to approach the fire occurrence location. According to this example, it is possible to give alert notice and perform evacuation guidance based on a fire occurrence detection position.

The evacuation guidance system of this example can be applied as an entrance and leaving guidance system that provides guidance on a moving direction during the entrance and leaving of an audience in facilities such as a concert hall and a stadium. In this case, for example, a mobile communication terminal, such as a smart phone, which is held by the audience is used as a sensor, and data server 17 detects the number of mobile communication terminals connected for each area within the facilities through a wireless Local Area Network (LAN) and estimates the number of audiences, a congested area, and the degree of congestion. Data server 17 transmits guidance information based on a sound or an image for each area so as to enable smooth entrance and leaving, and indicates a moving direction of the audience.

Figure 15:
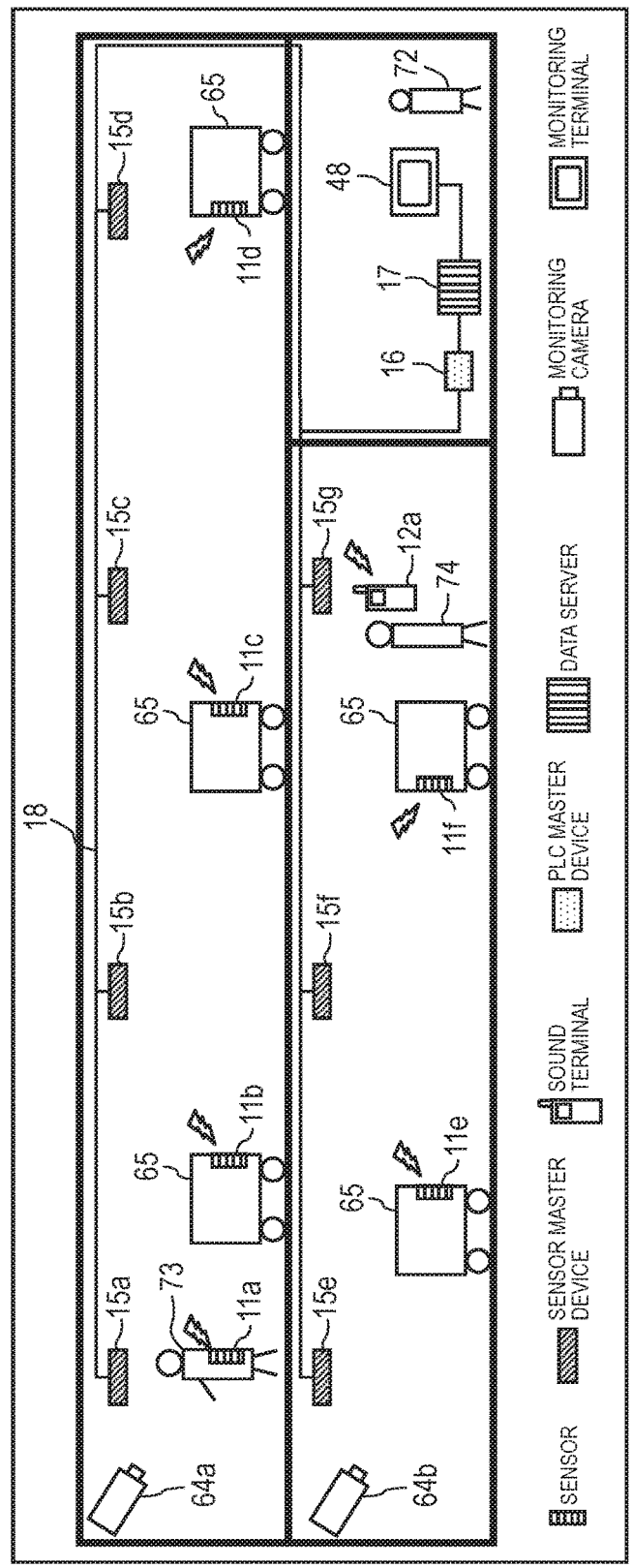
FIG. 15 is a diagram showing a configuration and operation of a system of a third use case.

FIG. 15 is a diagram showing a configuration and operation of a system of a third use case. The third use case is an example of a location management system that detects the position of a person or an object by a sensor to perform location management.

In an area to be detected, a person and an object which are to be detected are equipped with sensors 11a, 11b, 11d, 11e, and 11f using an RFID tag and the like. In the example shown in the drawing, operator 73 in a second floor is mounted with sensor 11a, and carrier car 65 having products or components loaded therein is mounted with sensors 11b to 11f. Manager 74 in a first floor has sound terminal 12a to be able to talk with a monitoring person in a monitoring room, and the like. Monitoring cameras 64a and 64b are installed in each floor.

Sensor master devices 15a, 15b, 15c, 15d, 15e, 15f, and 15g are installed on the ceiling in each floor. Sensors 11a to 11f and sound terminal 12a are wirelessly connected to sensor master devices 15a to 15g. Sensor master devices 15a to 15g are connected to power line 18 wired inside the ceiling of each room, and are connected to PLC master device 16 through power line 18. PLC master device 16 and data server 17 are installed in a monitoring room, PLC master device 16 is connected to power line 18 wired inside the wall, and PLC master device 16 and data server 17 are connected to each other in a wired manner. Monitoring terminal 48 including a display is connected to data server 17. Monitoring person 72 in the monitoring room visually monitors monitoring terminal 48. In a case where an abnormality is detected, the monitoring person notifies sound terminal 12a owned by manager 74 of the abnormality by operating the terminal.

Sensor master devices 15a to 15g receive wireless radio waves from sensors 11a to 11f using a Radio Frequency Identification (RFID) tag and the like, and acquires the reception intensity of the received signal. Data server 17 estimates the position of each sensor in accordance with reception intensities of sensor signals acquired in the plurality of sensor master devices, on the basis of detection information of sensors 11a to 11f by sensor master devices 15a to 15g. Thereby, it is possible to ascertain where a person or an object, which is to be detected, is present within an area to be detected, whether or not the person or an object, which is to be detected, is present in its expected place, whether or not the person or an object, which is to be detected, enters an entry prohibition area, and the like.

It is also possible to combine detection information obtained by sensors 11a to 11f and monitoring images captured by monitoring cameras 64a and 64b with each other. For example, monitoring person 72 compares the position of a person or an object, which is to be detected, which is detected by sensors 11a to 11f with captured images of a predetermined area which are obtained by monitoring cameras 64a and 64b, and confirms whether or not the position of the sensor matches the captured actual position of the object to be detected. Thereby, it is possible to detect an abnormality, for example, in a case where the sensor is removed from the object to be detected.

The third use case can be applied to the following system. For example, in a factory and the like, the third use case can be applied to a case where it is monitored whether or not an operator is correctly positioned in an area in charge or whether or not the operator goes outside the area in charge. The third use case can be applied to location management of a carrier car, a container, or the like. Alternatively, in facilities for the old or hospitals, the third use case can be applied to location management for ascertaining the location of an aged person or a patient. The third use case can be applied to location management for ascertaining the location of equipment or an apparatus such as a wheelchair or an inspection machine.

As described above, in the embodiment, wireless communication using DECT and the like and wired communication using power line communication are used jointly in data transmission between the sensor, the sensor master device, the data server, the sensor master device, and the notification device, and the collecting of detection information by the sensor and the transmission of notification information based on the detection information are performed. Thereby, it is possible to simply construct a network which is capable of changing notification contents of alert notice and a transmission destination of an object to be notified, in accordance with the position of an abnormality detected and detection contents, for example, when an abnormality occurs.

It is possible to construct a layout-free sensor network system by using wireless communication such as DECT between the sensor and the sensor master device and using power line communication between the sensor master device and the data server, and to flexibly cope with a free change in disposition. The sensor transmits detection information to the sensor master device by wireless communication, and thus can be easily installed at a desired location. In a case where a DECT communication system is used, it is possible to transmit both a sound signal and data. The DECT communication system less interferes with other communication systems such as a wireless LAN and has a large communication area, and thus it is possible to perform stable wireless communication. In a case where power line communication is used, it is possible to perform communication using the wiring of a power line which is already installed, and to easily install the sensor master device at a desired location as long as the location is a location where a power line is laid. In the power line communication, it is possible to stably execute even communication beyond a wall and a floor and to adapt to a wide area to be detected such as large-scale facilities.

In a case where the position of the sensor is changed, it is possible to change the sensor management table in the data server and to appropriately change pairing of the sensor and the sensor master device. Also in a case where the sound terminal, the notification device, and the like are moved, it is possible to similarly update pairing with the sensor master device. For this reason, it is possible to easily adapt to the detection of state of the sensor after the disposition thereof is changed, and to notification, such as alert notice, which is to be given to the sound terminal or the notification device.

Therefore, according to the embodiment, it is possible to realize the sensor network system which is capable of simply constructing a system by flexibly coping with any disposition of an object to be detected and which is capable of stably acquiring detection information. It is possible to simply construct the sensor network system capable of performing adaptive notification in accordance with a detection position, detection contents, and the like of a sensor.

The sensor network system according to the embodiment includes sensor master device 15 that receives detection information obtained by sensor 11, data server 17 that acquires detection information from sensor master device 15, and notification device 13 that receives notification information from data server 17 to perform notification. Sensor master device 15 is connected to sensor 11 by wireless communication, sensor master device 15 and data server 17 are connected to each other by wired communication including power line communication, data server 17 and notification device 13 are connected to each other by wired communication in which at least a portion of a communication route includes power line communication, through sensor master device 15, and data server 17 executes notification corresponding detection information for at least one of an object to be notified and notification contents, on the basis of the acquired detection information.

Thereby, it is possible to realize the sensor network system which is capable of simply constructing a system by flexibly coping with any disposition of an object to be detected and which is capable of stably acquiring detection information, with a system configuration in which wireless communication having a high degree of freedom of disposition and power line communication are combined with each other. It is possible to simply construct a system which is capable of performing adaptive notification in accordance with detection information such as a detection position, detection contents, and the like of a sensor.

In the sensor network system according to the embodiment, plurality of sensor master devices 15 may be provided at different positions, and data server 17 may acquire a detection position which is detection information detected by sensor 11 and may execute notification of notification contents corresponding to the detection position.

Thereby, it is possible to execute appropriate notification, for example, notification of a location where an abnormality such as a fire occurs, in accordance with the detection position.

In the above-described sensor network system, plurality of notification devices 13 may be provided at different positions, and data server 17 may determine notification device 13 to be notified in accordance with a detection position which is detection information and may execute notification on notification device 13 to be notified.

Thereby, it is possible to determine a notification device located at an appropriate position, such as the vicinity and surroundings of the detection position, to be an object to be notified in accordance with the detection position, and to execute notification.

In the sensor network system according to the embodiment, plurality of notification devices 13 may be provided at different positions, and data server 17 may execute notification of notification contents corresponding to the position of notification device 13.

Thereby, it is possible to execute appropriate notification, for example, guidance of an evacuation route based on a position in a case where an abnormality such as a fire occurs, in accordance with the position of the notification device.

In the above-described sensor network system, plurality of sensor master devices 15 may be provided at different positions, and data server 17 may acquire a detection position which is detection information, may determine a notification device to be notified in accordance with the detection position, and may execute notification on the notification device to be notified.

Thereby, it is possible to determine a notification device located at an appropriate position, such as the vicinity and surroundings of the detection position, to be an object to be notified in accordance with the detection position, and to execute notification.

While various embodiments have been described above with reference to the accompanying drawings, it is needless to say that this disclosure is not limited to such examples. It would be apparent for those skilled in the technical field to which the invention belongs that various modified examples or corrected examples are conceivable within the scope of the technical idea recited in the claims, and it would be understood that these fall within the technical scope of the invention.

INDUSTRIAL APPLICABILITY

This disclosure is useful as a sensor network system which is capable of simply constructing a system by flexibly coping with any disposition of an object to be detected and stably acquiring detection information, and a sensor network system which is capable of simply constructing a system capable of performing adaptive notification in accordance with a detection position of a sensor, detection contents, and the like.

REFERENCE MARKS IN THE DRAWINGS 11, 11A to 11F, 11a to 11m SENSOR
12, 12A, 12B, 12a to 12c SOUND TERMINAL
13, 13A, 13B, 13a to 13d NOTIFICATION DEVICE
15, 15A to 15D, 15a to 15g SENSOR MASTER DEVICE
16 PLC MASTER DEVICE
17 DATA SERVER
18 POWER LINE
21 DECT COMMUNICATION UNIT
22 PLC COMMUNICATION UNIT
48 MONITORING TERMINAL
51 ALERT TRANSMISSION SCREEN
62a to 62d EMERGENCY BUTTON DEVICE
63, 63a, 63b GUIDANCE LIGHT

The invention claimed is:
1. A sensor network system comprising:
a plurality of sensor master devices at different positions;
a data server;
a plurality of notification devices at different positions; and
a terminal device including an operation unit for a display screen,
wherein the display screen includes a layout display of a sensor, the plurality of sensor master devices, and the plurality of notification devices,
wherein the terminal device, in operation, displays the display screen on a display unit,
wherein the plurality of sensor master devices includes a first sensor master device and a second master device that are disposed in a sensor reaction area,
wherein the first sensor master device is connected to the sensor by wireless communication,
wherein the plurality of sensor master devices and the data server are connected to each other by wired communication including power line communication, wherein the data server and the plurality of notification device are connected to each other by wired communication in which at least a portion of a communication route includes power line communication via the plurality of sensor master devices, and wherein the first sensor master device, in operation, receives detection information for the sensor reaction area from the sensor, wherein the data server, in operation, acquires the detection information from the first sensor master device, determines whether or not to perform a notification on the basis of the detection information acquired from the sensor, and executes the notification corresponding to the detection information for at least one of an object to be notified and notification contents in a case where the data server determines to perform the notification, wherein, in a case where the data server determines to perform the notification, the data server transmits notification information corresponding to the detection information to the terminal device, wherein, in response to the terminal device receiving the notification information, the terminal device includes a layout display of the sensor reaction area having the first sensor master device disposed therein, in the display screen, and wherein, in response to the sensor reaction area being selected as a notice area by a selection operation using the operation unit, the data server transmits the notification information to a notification device of the plurality of notification devices via the second sensor master device.

2. The sensor network system of claim 1,
wherein the data server, in operation, acquires a detection position, and executes the notification of the notification contents corresponding to the detection position.

3. The sensor network system of claim 2,
wherein the data server, in operation, determines a notification device of the plurality of notification devices to be notified in accordance with the detection position, and executes notification on the notification device of the plurality of notification devices to be notified.

4. The sensor network system of claim 1,
wherein the data server, in operation, executes the notification of the notification contents corresponding to the positions of the plurality of notification devices.

5. The sensor network system of claim 4,
wherein the data server, in operation, acquires a detection position, determines a notification device of the plurality of notification devices to be notified in accordance with the detection position, and executes notification on the notification device of the plurality of notification devices to be notified.

6. The sensor network system of claim 1,
wherein, in response to a vicinity of the sensor reaction area being selected as a notice area by a selection operation using the operation unit, the data server transmits the notification information to a third notification device via a third sensor master device disposed in the vicinity of the sensor reaction area.

7. The sensor network system according to claim 1,
wherein the data server, in operation, determines pairing for associating the sensor and the first sensor master device with each other in accordance with the position of the sensor, and further includes a sensor management table for managing the sensor, and wherein the data server, in operation, updates the sensor management table and changes the pairing in a case where the position of the sensor is changed.

8. The sensor network system according to claim 1, further comprising:
a guidance light which, in operation, indicates an evacuation route to an evacuee,
wherein the data server, in operation, controls a lighting pattern of the guidance light in accordance with a position of the sensor.

9. The sensor network system of claim 8,
wherein the data server, in operation, transmits evacuation information indicating an evacuation location to a notification device of the plurality of notification devices that is located in a vicinity of the guidance light to guide the evacuee to the evacuation location.

10. The sensor network system of claim 8,
wherein the guidance light is connected to each of the plurality of sensor master devices in a wired manner.

11. The sensor network system according to claim 6,
wherein the data server, in operation, determines pairing for associating the sensor and the first sensor master device with each other in accordance with the position of the sensor, and further includes a sensor management table for managing the sensor, and
wherein the data server, in operation, updates the sensor management table and changes the pairing in a case where the position of the sensor is changed.

12. The sensor network system according to claim 6, further comprising:
a guidance light which, in operation, indicates an evacuation route to an evacuee,
wherein the data server, in operation, controls a lighting pattern of the guidance light in accordance with a position of the sensor.

13. The sensor network system according to claim 7, further comprising:
a guidance light which, in operation, indicates an evacuation route to an evacuee,
wherein the data server, in operation, controls a lighting pattern of the guidance light in accordance with a position of the sensor.

14. The sensor network system of claim 9,
wherein the guidance light is connected to each of the plurality of sensor master devices in a wired manner.

15. A sensor network system comprising:
a plurality of sensor master devices at different positions;
a data server;
a plurality of notification devices at different positions; and
a terminal device including an operation unit for a display screen,
wherein the display screen includes a layout display of a sensor, the plurality of sensor master devices, and the plurality of notification devices,
wherein the terminal device, in operation, displays the display screen on a display unit,
wherein the plurality of sensor master devices includes a first sensor master device that is disposed in a sensor reaction area,
wherein the first sensor master device is connected to the sensor by wireless communication,
wherein the plurality of sensor master devices and the data server are connected to each other by wired communication including power line communication,
wherein the data server and the plurality of notification device are connected to each other by wired communication in which at least a portion of a communication route includes power line communication via the plurality of sensor master devices, and wherein the first sensor master device, in operation, receives detection information for the sensor reaction area from the sensor, wherein the data server, in operation, acquires the detection information from the first sensor master device, determines whether or not to perform a notification on the basis of the detection information acquired from the sensor, and executes the notification corresponding to the detection information for at least one of an object to be notified and notification contents in a case where the data server determines to perform the notification, wherein, in a case where the data server determines to perform the notification, the data server transmits notification information corresponding to the detection information to the terminal device, wherein, in response to the terminal device receiving the notification information, the terminal device includes a layout display of the sensor reaction area having the first sensor master device disposed therein, in the display screen, and wherein, in response to a vicinity of the sensor reaction area being selected as a notice area by a selection operation using the operation unit, the data server transmits the notification information to a notification device of the plurality of notification devices via a second sensor master device of the plurality of sensor master devices that is disposed in the vicinity of the sensor reaction area.

16. The sensor network system according to claim 15, wherein the data server, in operation, determines pairing for associating the sensor and the first sensor master device with each other in accordance with the position of the sensor, and further includes a sensor management table for managing the sensor, and wherein the data server, in operation, updates the sensor management table and changes the pairing in a case where the position of the sensor is changed.

17. The sensor network system according to claim 15, further comprising:

a guidance light which, in operation, indicates an evacuation route to an evacuee, wherein the data server, in operation, controls a lighting pattern of the guidance light in accordance with a position of the sensor.

* * * * *